(12) United States Patent
Ram et al.

(10) Patent No.: US 9,416,456 B1
(45) Date of Patent: Aug. 16, 2016

(54) NANO-HYBRID STRUCTURED REGIOREGULAR POLYHEXYLTHIOPHENE (RRPHTH) BLEND FILMS FOR PRODUCTION OF PHOTOELECTROCHEMICAL ENERGY

(75) Inventors: Manoj Kumar Ram, Palm Harbor, FL (US); Ashok Kumar, Tampa, FL (US)

(73) Assignee: University of South Florida, Tampa, FL (US)

( * ) Notice: Subject to any disclaimer, the term of this patent is extended or adjusted under 35 U.S.C. 154(b) by 241 days.

(21) Appl. No.: 13/476,488

(22) Filed: May 21, 2012

Related U.S. Application Data

(60) Provisional application No. 61/488,446, filed on May 20, 2011.

(51) Int. Cl.
*C25B 1/00* (2006.01)
*C25B 11/04* (2006.01)

(52) U.S. Cl.
CPC ............. *C25B 1/003* (2013.01); *C25B 11/0489* (2013.01)

(58) Field of Classification Search
CPC ........ C25D 17/001; C25D 7/126; C25D 9/02; C25D 13/04; C25B 1/003; C25B 9/06; C25B 11/04; C25B 11/0405; C25B 11/0442; C25B 11/0478; C25B 11/0489
USPC ........................ 204/290.11; 205/109; 136/263
See application file for complete search history.

(56) References Cited

U.S. PATENT DOCUMENTS

| | | | |
|---|---|---|---|
| 7,294,288 B2 | 11/2007 | Koller et al. | |
| 7,713,779 B2 | 5/2010 | Firon et al. | |
| 2005/0110024 A1* | 5/2005 | Swain et al. | 257/77 |
| 2005/0189014 A1* | 9/2005 | Gaudiana et al. | 136/256 |
| 2006/0225782 A1* | 10/2006 | Berke et al. | 136/252 |
| 2007/0063964 A1* | 3/2007 | Kawahara et al. | 345/107 |
| 2007/0251570 A1* | 11/2007 | Eckert et al. | 136/256 |
| 2008/0308155 A1* | 12/2008 | Fukui et al. | 136/261 |
| 2009/0266418 A1* | 10/2009 | Hu et al. | 136/260 |
| 2010/0065123 A1* | 3/2010 | Gust et al. | 136/263 |
| 2012/0090679 A1* | 4/2012 | Chittibabu et al. | 136/256 |

OTHER PUBLICATIONS

Nagata et al. Fabrication, nanostructures and electronic properties of nanodiamond-based solar cells. Progress in Natural Science: Materials International 20. 2010. pp. 38-42.*

(Continued)

*Primary Examiner* — Ciel Thomas
(74) *Attorney, Agent, or Firm* — Nilay J. Choksi; Smith & Hopen, P.A.

(57) ABSTRACT

The novel photoelectrochemical nano-hybrid film fabricated by blending regioregular polyhexylthiophene (RRPHTh) with titanium oxide ($TiO_2$), Zinc oxide (ZnO) and nanodiamond (ND) nanoparticles on ITO coated glass plate, n-type silicon, and gold coated glass surfaces. The photoelectrochemical study reveals photoinduced electron transfer in nano-hybrid RRPHTh with donor and ND as acceptor providing a molecular approach to high-efficiency photoelectrochemical conversion properties. The ND-RRPHTh has shown promising morphological and photoelectrochemical properties than RRPHTh as well as $TiO_2$-RRPHTh and ZnO-RRPHTh nano-hybrid films.

19 Claims, 16 Drawing Sheets

(56) References Cited

OTHER PUBLICATIONS

Aasmundtveit, K. E.; Samuelsen, E. J.; Guldstein, M.; Steinsland, C.; Flornes, O.; Fagermo, C.; Seeberg, T. M.; Pettersson, L. A. A.; Inganas, O.; Feidenhans'l, R.; Ferrer, S., Structural Anisotropy of Poly(alkylthiophene) Films, Macromolecules 2000, 33, pp. 3120-3127.

Abken, A. E.; Halliday, D. P.; Durose, K. J.,Photoluminescence Study of Polycrystalline Photovoltaic CdS Thin Film Layers Grown by Close-Spaced sublimation and Chemical Bath Deposition, Journal of Applied Physics, 105, 064515 (2009).

Biju, V.; Kanemoto, R.; Matsumoto, Y.; Ishii, S.; Nakanishi, S.; Itoh, T.; Baba, Y. Ishikawa, M., Photoinduced Photoluminescence Variations of CdSe Quantum Dots in Polymer Solutions. J. Phys. Chem. C. 2007, 111, pp. 7924-7932.

Boland, P.; Sunkavalli, S. S.; Chennuri, S.; Foe, K.; Adbel-Fattah, T.; Namkoong, G., Investigation of Structural, Optical, and Electrical Properties of Regioregular Poly(3-hexylthiophene)/Fullerene Blend Nanocomposites for Organic Solar Cells. Thin Solid Films. vol. 518, Issue 6, (2010) pp. 1728-1731.

Johann Boucle, Sabina Chyla, Milo S. P. Shaffer, James R. Durrant, Donal D. C. Bradley, Jenny Nelson, Hybrid Solar Cells from a Blend of Poly(3-hexylthiophene) and Ligand-Capped TiO2 Nanorods, Advanced Functional Materials (2008) 18, 622-633.

A.J. Breeze, Z. Schlesingerb, S.A. Carter, H. Tillmann, H.-H. Horhold, Improving Power Efficiencies in Polymer—Polymer Blend Photovoltaics, Solar Energy Materials & Solar Cells, 83 (2004) pp. 263-271.

Buvat, P.; Hourquebie, P., Enhanced Infrared Properties of Regioregular Poly(3-alkylthiophenes), Macromolecules, (1997), 30, pp. 2685-2692.

Cui, D., Xu, J., Zhu, T., Paradee, G., Ashok, S., Gerhold, M., Harvest of Near Infrared Light in PbSe Nanocrystal-Polymer Hybrid Photovoltaic Cells, Applied Physics Letters, (2006) 88, 183111.

B.O., Dabbousi, M. G. Bawendi, O. Onitsuka, and M. F. Rubner, Electroluminescence from CdSe Quantum-dot/polymer Composites, Appl. Phys. Lett. 66, pp. 1316-1318 (1995).

H. Ding, M. K. Ram, C. Nicolini, Fabrication and Characterization of Composite Langmuir-Schaefer Films of Poly (Ortho-Anisidine) Conducting polymer and tri- (2,4-di-t-amylphenoxy)-(8-quinolinolyl) copper phthalocyanine, synthetic metals 118 (2001) pp. 81-88.

Ding, H.; Ram, M. K.; Nicolini, C. J., Nanofabrication of Organic/Inorganic Hybrid of TiO2 with substituted Phthalocyanine or polythiophene, Journal of Nanoscience and Nanotechnology 1, 207-213, 2001.

Reyes-Reyes, M.; Kim, K.; Carroll, D. L., High-Efficiency Photovoltaic Devices Based on Annealed Poly(3-hexylthiophene) and 1-(3-methoxycarbonyl)-Propyl-1-phenyl-(6,6)C61 Blends, Appl. Phys. Lett. (2005), 87, 8, 083506.

Rikukawa, M.; Nakagawa, M.; Ishida, K.; Abe, H.; Sanui, K.; Ogata, N., Electrical Properties of Conductive Langmuir-Blodgett Films Comprised of Head-to-tail Poly(3-hexylthiophene), Thin Solid Films. (1996), 284-285, pp. 636-639.

J. S. Salafsky, W. H. Lubberhuizen, R. E. I. Schropp, Photoinduced Charge Seperation and Recombination in a Conjugated Polymer-Semiconductor Nanocrystal Composite, Chem. Phys. Lett. (1998), 290, pp. 297-303.

Selmarten, D.; Jones, M.; Rumbles, G.; Yu, P.; Nedeljkovic, J.; Shaheen, S., Quenching of Semiconductor Quantum Dot Photoluminescence by a Pi-Conjugated Polymer, J. Phys. Chem. B. (2005), 109, pp. 15927-15932.

Shim, H. S.; Kim, J. W.; Kim, W. B. J., Fabrication and Optical Properties of Conjugated Polymer Composited Multi-Arrays of TiO2 Nanowires via Sequential Elctrospinning, Journal of Nanoscience and Nanotechnology, vol. 9, (2009) pp. 4721-4726.

Sirringhaus, H.; Tessler, N.; Friend, R. H., Integrated Optoelectronic Devices Based on Conjugated Polymers, Science (1998), vol. 280, pp. 1741-1744.

Sirringhaus, H.; Brown, P.J.; Friend, R. H.; Nielsen, M. M.; Bechgaard, K.; Langeveld-Voss, B. M. W.; Spiering, A. J. H.; Janssen, R. A. J.; Meijer, E. W.; Herwig, P.; De Leeuw, D. W., Two-dimensional Charge Transport in Self-Organized, High-Mobility Conjugated Polymers, Letters to Nature, vol. 401, (1999), pp. 685-688.

Stavrinadis, A.; Xu, S.; Warner, J. H.; Hutchison, J. L.; Smith, J. M.; Watt, A. R., Superstructures of PbS Nanocrystals in a Conjugated Polymer and the Aligning Role of Oxidation, Nanotechnology (2009) 20, 445608.

Valter, B.; Ram, M. K.; Nicolini, C., Synthesis of Multiwalled Carbon Nanotubes and Poly(o-anisidine) Nanocomposite Material: Fabrication and Characterization of its Langmuir-Schaefer Films, Langmuir (2002), 18, pp. 1535-1541.

Y. Wang, and N. Herron, Photoconductivity of CdS nanocluster-doped polymers. Chem. Phys. Lett. vol. 200, No. 1, 2, pp. 71-75 (1992).

Wu, M.-C.; Liao, H.-C.; Lo, H.-H.; Chen, S.; Lin, Y.-Y; Yen, W.-C.; Zeng, T.-W; Chen, C.-W.; Chen, Y.-F.; Su, W.-F., Nanostructured Polymer Blends (P3HT/PMMA): Inorganic Titania Hybrid Hotovoltaic Devices, Sol. Energy Mater. Sol. Cells. (2009), 93, pp. 961-965.

Yamamoto, T.; Honda, Y.; Sata, T.; Kokubo, H., Electrochemical Behavior of Poly(3-hexylthiophene). Controlling Factors of Electric Current in Electrochemical Oxidation of Poly(3-hexylthiophene)s in a Solution, Polymer 45 (2004) pp. 1735-1738.

Yang, H.; Shin, T. J.; Yang, L.; Cho, K.; Ryu, C. Y.; Bao, Z., Effect of Mesoscale Crystalline Structure on the Field-Effect Mobility of Regioregular Poly(3-hexyl thiophene) in Thin-Film Transistors, Adv. Funct. Mater. (2005) 15, No. 4, Apr. pp. 671-676.

Yazawa, K.; Inoue, Y.; Shimizu, T.; Tansho, M.; Asakaw, N. J., Molecular Dynamics of Regioregular Poly(3-hexylthiophene) Investigated by NMR Relaxation and an Interpretation of Temperature Dependent Optical Absorption, J. Phys. Chem. B. (2010), 114, pp. 1241-1248.

Yu G., Gao J., Hummelen J. C., Wudl F., and Heeger A. J., Polymer Photovoltaic Cells: Enhanced Efficiencies via a Network of Internal Donor-Acceptor Heterojunctions, Science, vol. 270, Dec. (1995) pp. 1789-1791.

Zhao, L.; Wang, J.; Lin, Z., Semiconducting Nanocrystals, Conjugated Polymers, and Conjugated Polymer/Nanocrystal Nanohybrids and their usage in Solar Cells, Front Chemical China (2010), 5, pp. 33-44.

Schrand et al., Nanodiamond Particles: Properties and Perspectives for Bioapplications. Critical Review in Solid State and Materials Sciences. 2009. vol. 34: 18-74.

Dolmatov. Detonation synthesis ultradispersed diamonds: properties and applications. Russian Chemical Reviews. 2001. vol. 79 (No. 7): 607-626.

Gomez et al., Novel Synthesis, Characterization, and Corrosion Inhibition Properties of Nanodiamond—Polyaniline Films. J. Phys. Chem. C. 2010. vol. 114:18797-18804.

Ram et al., Novel Nanohybrid Structurued Regioregular Polyhexylthiophene Blend Films for Photoelectrochemical Energy Applications. J. Phys. Chem. C. 2011. vol. 115: 21987-21995.

* cited by examiner

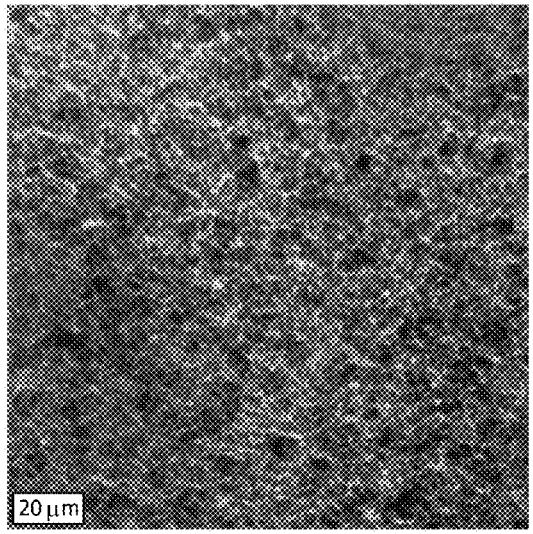 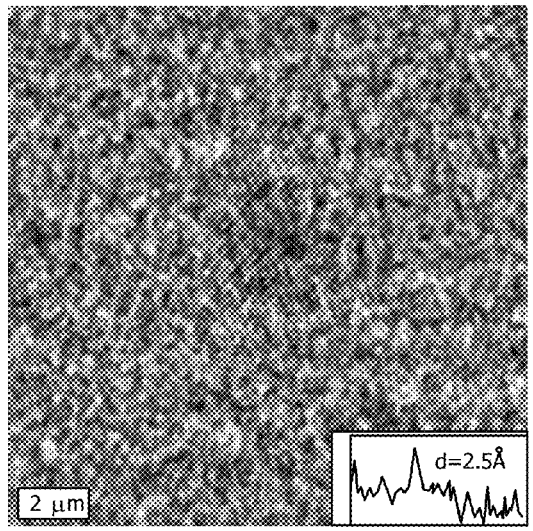
FIG. 5A        FIG. 5B
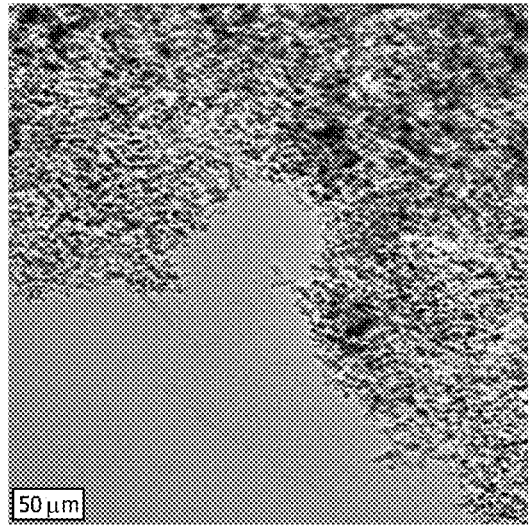 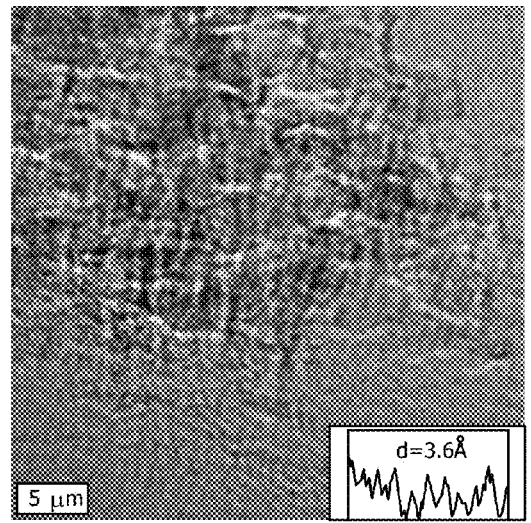
FIG. 5C        FIG. 5D

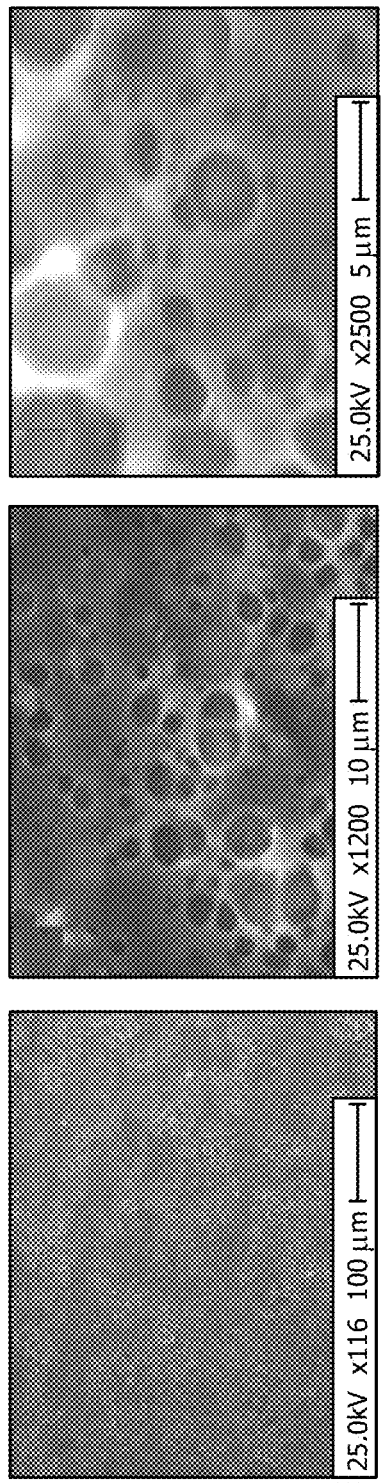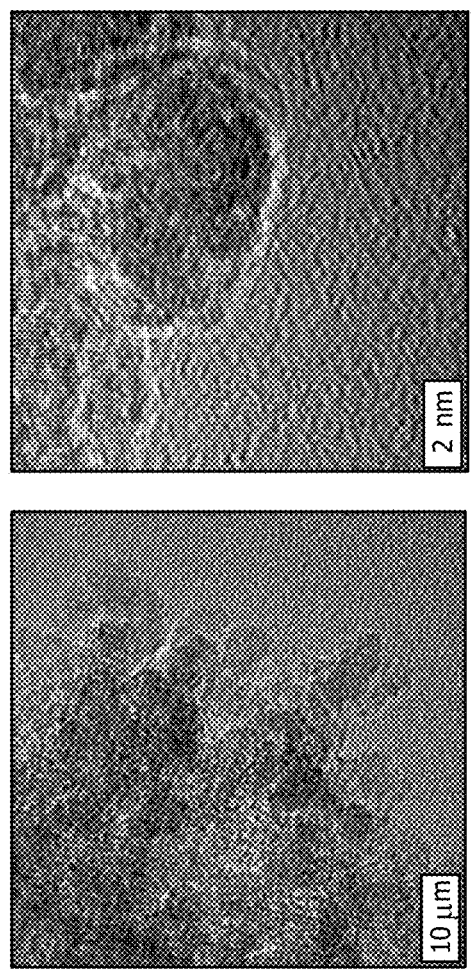
FIG. 15C
FIG. 15B
FIG. 15A
FIG. 16B
FIG. 16A

NANO-HYBRID STRUCTURED REGIOREGULAR POLYHEXYLTHIOPHENE (RRPHTH) BLEND FILMS FOR PRODUCTION OF PHOTOELECTROCHEMICAL ENERGY

CROSS-REFERENCE TO RELATED APPLICATIONS

This nonprovisional application claims priority to U.S. Provisional Application No. 61/488,446, entitled "Novel Nano-Hybrid Structured Regioregular Polyhexylthiophene (RRPHTh) Blend Films for Photoelectrochemical Energy Application," filed by the same inventors on May 20, 2011, the contents of which are hereby incorporated by reference.

STATEMENT OF GOVERNMENT INTEREST

This invention was made with Government support under Grant No. ECCS-1066643, awarded by National Science Foundation. The government has certain rights in the invention.

BACKGROUND OF THE INVENTION

1. Field of the Invention

This invention relates to methods of using nano-hybrid structured regioregular polyhexylthiophene for photoelectrochemical energy application.

2. Description of the Prior Art

In recent years, the photoelectrochemical, organic light emitting diodes, optoelectronic and solar cell devices based on conjugated polymer (p-type) and inorganic nanomaterials (n-type) have been studied due to their high electron mobility, chemical and physical stability of inorganic nanoparticles, and by large ease in fabrication and the flexibility in fabrication of larger cells at low cost. (Günes, S.; Neugebauer, H.; Sariciftci, N. S. Chem. Rev. 2007, 107, 1324-1338; Kim, J. S.; Kim, W. J.; Cho, N.; Shukla, S.; Yoon, H.; Jang, J.; Prasad, P. N.; Kim, T. D.; Lee, K. S. J. Nanosci. Nanotech. 2009, 9, 6957-6961).

The promising photo-conversion efficiencies in photovoltaic systems with PbSe, CdS, CdSe, and nanocrystals in hybrid structures with conjugated polymer in multilayered systems have been studied at large (Huynh, W.; Dittmer, J. J.; Alivisatos, A. P. Science. 2002, 295, 2425-2427; Cui, D.; Xu, J.; Zhu, T.; Paradee, G.; Ashok, S.; Gerhold, M. Appl. Phys. Lett. 2006, 88, 183111; Biju, V.; Kanemoto, R.; Matsumoto, Y.; Ishii, S.; Nakanishi, S.; Itoh, T.; Baba, Y.; Ishikawa, M. J. Phys. Chem. C. 2007, 111, 7924-7932; McCumiskey, E. J.; Chandrasekhar, N.; Taylor, C. R. Nanotechnology. 2010, 21, 225703; Abken, A. E.; Halliday, D. P.; Durose, K. J. Appl. Phys. 2009, 105, 064515). Quantum materials (e.g., polymer-nanocrystal systems) appear promising, but the use of a toxic precursor (e.g., Cd, Pb, etc.) remains a limitation to their development as an alternative to inorganic devices on a large-scale fabrication. In this context, $TiO_2$ and ZnO nanomaterials, which are non-toxic, offer physical and chemical stability and are promising candidates for hybrid heterojunction photovoltaic cells (Boucle, J.; Chyla, S.; Shaffer, M. S. P.; Durrant, J. R.; Bradley, D. D. C.; Nelson, J. Adv. Funct. Mater. 2008, 18, 4, 622-633; Lin, Y.-Y.; Chu, T.-H.; Li, S.-S.; Chuang, C.-H.; Chang, C.-H.; Su, W.-F.; Chang, C.-P.; Chu, M.-W.; Chen, C.-W. J. Am. Chem. Soc. 2009, 131, 10, 3644-3649; Mane, R. S.; Lee, W. J.; Pathan, H. M.; Han, S.-H. J. Phys. Chem. B. 2005, 109, 24254-24259).

Recently, reports have been devoted to $TiO_2$ nanocrystal (nc) polymer blends, mainly because of a strong incompatibility of the polar nanoparticles with common organic solvents. The use of higher hole mobility polymer such as poly (3-hexylthiophene) blends with commercial nc-$TiO_2$ based photovoltaic device has shown external quantum efficiencies up to 15% in an overall AM1.5 solar power conversion system (Breeze, A. J.; Schlesinger, Z.; Carter, S. A.; Tillmann, H.; Horhold, H.-H. Sol. Energy Mater. Sol. Cells. 2004, 83, 263-271; Wu, M.-C.; Liao, H.-C.; Lo, H.-H.; Chen, S.; Lin, Y.-Y.; Yen, W.-C.; Zeng, T.-W.; Chen, C.-W.; Chen, Y.-F.; Sua, W.-F. Sol. Energy Mater. Sol. Cells. 2009, 93, 961-965; Shim, H. S.; Kim, J. W.; Kim, W. B. J. Nanosci Nanotechnol. 2009, 9, 4721-6). More recently, the blends of conjugated polymers and inorganic nanocrystals have offered high electron mobility with improved spectral coverage for energy applications (Stavrinadis, A.; Xu, S.; Warner, J. H.; Hutchison, J. L.; Smith, J. M.; Watt, A. R. Nanotechnology. 2009, 20, 445608; Zhao, L.; Wang, J.; Lin, Z. Front. Chem. China. 2010, 5, 33-44). The effective conduction path for charge transport in conjugated polymer blends with metal oxide or quantum dot still remains a challenge (Selmarten, D.; Jones, M.; Rumbles, G.; Yu, P.; Nedeljkovic, J.; Shaheen, S. J. Phys. Chem. B. 2005, 109, 15927-15932). The RRPHTh has a structure similar to hairy-rod polymers, which could be used for blending with inorganic particles, and form semicrystalline films with crystalline domains embedded in an amorphous matrix (Li, G.; Shrotriy, V.; Yao, Y.; Huang, J.; Yang, Y. J. Mater. Chem. 2007, 17, 3126-3140; Iovu, M. C.; Zhang, R.; Cooper, J. R.; Smilgies, D. M.; Javier, A. E.; Sheina, E. E.; Kowalewski, T.; McCullough, R. D. Macromol. Rapid Commun. 2007, 28, 1816-1824; Yazawa, K.; Inoue, Y.; Shimizu, T.; Tansho, M.; Asakaw, N. J. Phys. Chem. B. 2010, 114, 1241-1248). The high degree of crystallinity and strong inter-chain interactions in RRPHTh would lead to higher charge mobility since the carriers are no longer confined to a single chain (Loewe, R. S.; McCullough, R. D. Polym. Prepr. 1999, 40, 852-853; Ramajothi, J.; Ochiai, S.; Kojima, K.; Mizutani, T. Jpn. J. Appl. Phys. 2008, 47, 8279-8283; Reyes-Reyes, M.; Kim, K.; Carroll, D. L. Appl. Phys. Lett. 2005, 87, 8, 083506).

Recently, nanodiamond (ND) particles have gained attention due to facile surface functionalization, biocompatibility, quantum information processing, magnetotometry, novel imaging, and IR fluorescence application, and have been shown to enhance the optical and electrochemical properties of conducting polymers (Gomez, H.; Ram, M. K.; Alvi, F.; Stefanakos, E.; Kumar, A. J. Phys. Chem. C. 2010, 114, 18797-18804). These and all other referenced publications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Accordingly, what is needed is a nano-hybrid film having enhanced photoelectrochemical properties. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above.

However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF INVENTION

The long-standing but heretofore unfulfilled need for an improved, more effective and more efficient nano-hybrid film is now met by a new, useful and nonobvious invention.

The present invention provides a nano-hybrid film of nanodiamond (ND)-RRPHTh, $TiO_2$-RRPHTh and ZnO-RRPHTh on indium tin oxide (ITO) coated glass plate, n-type Si and gold coated glass surface. It is also characterized using a combination of physical and electrochemical techniques.

The RRPHTh may also be blended with poly(3-octylthiophene-2,5-diyl) (P3OT) and ND to exploit hybrid structures. Thus, the electrochemical, optical, surface and photochemical properties of ND-RRPHTh and ND-P3OT hybrid can be investigated in different electrolytes. The photoelectrochemical studies presented unexpected photo-conversion properties.

The present invention also provides a method of using of small quantities of nanodiamond to enhance photoconductivity RRPHTh polymers. Promising photoelectrochemical properties of blend ND-RRPHTh nano-hybrid film has been demonstrated. The photoelectrochemical properties of ND-RRPHTh deposited on either n-type silicon or ITO coated glass plate in TBATFB electrolyte is around 8 to 10 times higher in current density, and energy conversion efficiencies as compared to simple RRPHTh, $TiO_2$-RRPHTh and ZnO-RRPHTh nano-hybrid films.

In an embodiment, the current invention comprises a nano-hybrid film including a regioregular polythiophene blending substantially uniformly with nanoparticles. The nanoparticles include nanodiamonds, and the blending is achieved in a working electrode, counter electrode and reference electrode arranged in an electrolyte. The addition of nanodiamond to the polythiophene unexpectedly and synergistically enhances the photoconductivity of the nano-hybrid film.

The regioregular polythiophene may be a regioregular polyhexylthiophene.

The nanoparticles may further include titanium oxide and/or zinc oxide.

The working electrode can be an ITO coated glass plate. In a further embodiment, the counter electrode can be an n-type silicon coated glass surface. In yet a further embodiment, the reference electrode can be a gold coated glass surface.

The electrolyte may be tetrabutylammonium tetrafluoroborate.

The nano-hybrid film can be arranged in a photoelectrochemical cell or photovoltaic cell for use in photoelectrochemical applications.

The film can have a thickness of about 500 nm to about 1 μm.

The nanoparticles may have a blended particle size of about 20 nm to about 100 nm. This is larger than each nanoparticle when blended, and thus, the nanoparticles likely aggregate prior to blending with the polythiophene.

The film may further include poly(3-octylthiophene-2,5-diyl) polymers blended into the regioregular polythiophene to form the film.

In a separate embodiment, the current invention comprises a nano-hybrid film including any one or all of the foregoing limitations.

In a separate embodiment, the current invention includes a method of fabricating a photoelectrochemical cell with enhanced photoconductivity. The method includes the steps of blending nanoparticles into a regioregular polyhexylthiophene polymer on a substrate containing a working electrode, a counter electrode, and a reference electrode arranged within an electrolyte. The nanoparticles include nanodiamonds.

Zinc oxide and/or titanium oxide may also be blended into the polyhexylthiophene polymer with nanoparticles.

The working electrode may be an indium tin oxide coated glass plate. The reference electrode may be an n-type silicon coated glass surface. The reference electrode may be a gold coated glass surface.

The electrolyte may be tetrabutylammonium tetrafluoroborate providing enhanced photoconductivity.

A poly(3-octylthiophene-2,5-diyl) polymer may also be blended into the polyhexylthiophene polymer with nanoparticles.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 4(*b*) is a depiction of SEM images of ND-RRPHTh on silicon substrate.

FIG. 4(*c*) is a depiction of SEM images of ZnO-RRPHTh on silicon substrate.

FIG. 4(*d*) is a depiction of SEM images of $TiO_2$-RRPHTh on silicon substrate.

FIG. 5(*a*) is a depiction of TEM images of RRPHTh (~50 nm) on silicon substrate FIG. 5(*b*) is a depiction of TEM images of RRPHTh (~5 nm) on silicon substrate.

FIG. 5(*c*) is a depiction of TEM images of ND-RRPHTh (~50 nm) on silicon substrate.

FIG. 5(*d*) is a depiction of TEM images of ND-RRPHTh (~5 nm) on silicon substrate.

FIG. 15(a) is a depiction of SEM images of an ND-P3OT hybrid film.

FIG. 15(b) is a depiction of SEM images of an ND-P3OT hybrid film.

FIG. 15(c) is a depiction of SEM images of an ND-P3OT hybrid film.

FIG. 16(a) is a depiction of TEM images of an ND-P3OT hybrid film.

FIG. 16(b) is a depiction of TEM images of an ND-P3OT hybrid film.

DETAILED DESCRIPTION OF THE PREFERRED EMBODIMENT

Figure 1:
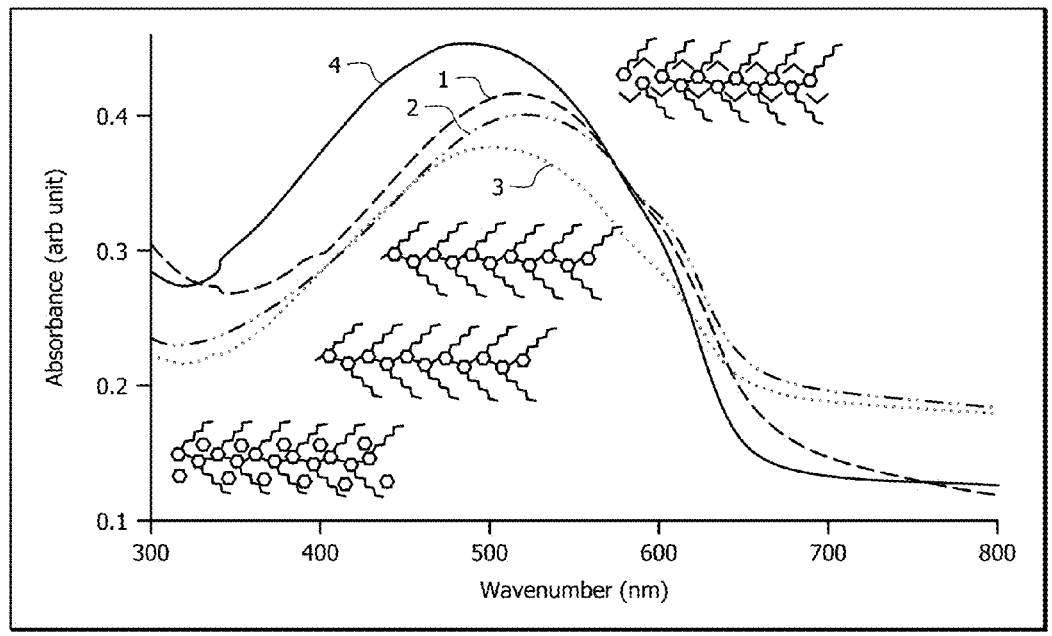
FIG. 1 is a depiction of the UV-vis absorption spectra of RRPHTH (curve 1); ND-RRPHTh (curve 2), ZnO-RRPHTh (curve 3) and $TiO_2$-RRPHTh (curve 4).

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In the broadest aspect, the present invention provides a nano-hybrid film of ND-RRPHTH, TiO$_2$-RRPHTh and ZnO-RRPHTh on ITO coated glass plate, n-type Si and gold coated glass surface. The film is fabricated and characterized using a combination of physical and electrochemical techniques.

The present invention provides the method of blending RRPHTh with $TiO_2$, ZnO and nanodiamond (ND) nanoparticles using chloroform as a solvent. The morphology, structure, optical, electrochemical and photoelectrochemical properties of nano-hybrid blend RRPHTh film on different substrates are also provided. The ND-RRPHTh has shown unexpected morphological and photoelectrochemical properties. The RRPHTh chains with ND show crystallinity due to diffusion of nanoparticles molecules to nucleation sites to form hexagonal aggregation.

The electrochemical and photochemical characteristics of RRPHTh hybrid film deposited on ITO coated glass plate, gold, and n-type silicon substrates, and gold coated glass surfaces in different electrolytes (e.g., acetonitrile (ACN)+ lithium perchlorate ($LiClO_4$), ACN+TBAFFBF, camphor sulfonic acid (CSA)+deionized water, hydrochloric acid (HCl) and sulfuric acid ($H_2SO_4$)) are provided. The nano-hybrid diamond film accepts the electrons from electron hole pairs, which are generated due to excitons, then move into the another electrode, such as a platinum electrode. Subsequently, the electron is moving from electrolyte to the other electrode. The ND-RRPHTh nano-hybrid film on n-type Si displays maximum photo-conversion efficiency. This simpler system, the conjugated polymer blending with nanomaterials, presents photo-conversion properties that can be exploited for a variety of photo-energy applications.

Example 1

The Blend Formation of the RRPHTh-Nanoparticles

RRPHTh, $TiO_2$ (2-10 nm), ZnO (av. 30-40 nm), $LiClO_4$, Camphor sulfonic acid, hydrochloric acid (37%), Acetonitrile, chloroform were all ACS grade, and purchased from Sigma-Aldrich (USA). The diamond nanoparticles (99%, dia 5-10 nm) were purchased from International Technology Center. All these chemicals and materials were employed as purchased without any further purification, unless otherwise specified.

The RRPHTh and nanoparticles (e.g., $TiO_2$, ZnO and ND) were mixed at 1:1 ratios in chloroform solvent. The RRPHTh was first dissolved and later, equal ratio by weight of $TiO_2$, ZnO and ND separately dispersed in the solution and stirred for 48 hrs. Care must be taken as longer stirred solution shows better blending properties. The resulting solution containing RRPHTh with nanoparticles were deposited on indium tin oxide (ITO) coated glass plates, n-type silicon, and gold coated glass substrates using solution cast and spin coating techniques in a thickness range varying from 500 nm-1 μm in average measured by stylus profiler.

Example 2

Optical Characterization

Optical spectroscopy is well known technique for characterizing conducting polymer to understand the absorption bands of inter- and/or intra-gap states. FTIR, Raman and UV-vis optical studies on RRPHTh hybrid with $TiO_2$, ZnO, NDs polymers is a preferred tool to derive information regarding the vibrational bands, Raman Shift and absorption bands of the film.

The vibrational bands of the nano-blend film deposited on (100) n-type silicon single crystal were measured by Fourier transform infrared (FTIR) spectrophotometer (Perkin-Elmer spectrum-1). The sample chamber of the spectrophotometer was continuously purged with nitrogen for 10-15 minutes before the data collection, as well as during the measurements for the elimination of the water vapor absorption. For each sample, eight (8) interferograms were recorded, averaged, and Fourier-transformed to produce a spectrum with a nominal resolution of 4 $cm^{-1}$. FTIR spectra of nano-blend films were obtained after proper subtraction from substrate silicon base line. UV-Vis spectra of RRPHTh blend film deposited of glass were made using a UV-Vis Spectrometer Jasco V-530. The Raman spectra deposited on n-type Si substrates were obtained by a visible-Raman spectrometer (Renishaw 1000) with an Ar laser at a wavelength of 514.5 nm, a laser spot of 1 μm using a laser power of 25 mW.

The morphology and size of the nano-hybrid RRPHTh films were investigated by field emission scanning electron microscopy (Hitachi-S4800) at 5 kV, and the molecular level morphology was explored using high-resolution transmission electron microscopy (JEOL 3011) at 300 kV. The electrochemical measurements were carried out using a Potentiostat/Galvanostat instrument (Radiometer Analytical—VoltaLab 40 PGZ301). A standard three electrode configuration was employed, where a glass/ITO/nano-hybrid RRPHTh film acted as a working electrode, a platinum wire as the counter electrode, and Ag/AgCl as the reference electrode. The reference for the absorbance was a bare ITO-coated glass plate in the corresponding electrolyte. A standard electrochemical cell with a three-electrode system was employed for the photoelectrochemical photocurrent response for the RRPHTh blend films (Ding, H.; Ram, M. K.; Nicolini, C. *Synthetic Metals*. 2001, 118, 81-88; Valter, B.; Ram, M. K.; Nicolini, C. *Langmuir*. 2002, 18, 1535-1541; Ram, M. K.; Sarkar, N.; Bertoncello, P.; Sarkar, A.; Narizzano, R.; Nicolini, C. *Synthetic Metals*. 2001, 122, 369-378; Ding, H.; Ram, M. K.; Nicolini, C. *J. Nanosci. Nanotechnol*. 2001, 1, 207-213; Ding, H.; Ram, M. K.; Zheng, L.; Nicolini, C. *J. Mater. Chem.* 2001, 36, 5423-5428). The electrochemical studies were performed in electrolytes 0.1 M HCl, 0.1 M $H_2SO_4$, 0.1 M $LiClO_4$ in propylene carbonate, 0.1 M CSA+water, and 0.1 TBATFB in ACN. The electrochemical cell contained films coated on the discussed substrates acting as working electrodes, platinum as a counter electrode, and Ag/AgCl as a reference electrode for water based electrolytes, whereas silver wire was used as a reference electrode for non-aqueous electrolytes. The photoelectrochemical properties of the nano-hybrid films, ND-RRPHTh, ZnO-RRPHTh and $TiO_2$-RRPHTh, in different electrolytes were studied using a 60 watt lamp illuminated from a distance of approximately 5 cm away from the working electrode. The switching on/off action from the visible light was controlled manually.

The UV-visible absorption spectra of RRPHTH (curve 1); ND-RRPHTh (curve 2), ZnO-RRPHTh (curve 3) and $TiO_2$-RRPHTh (curve 4) are shown in FIG. 1. The RRPHTh (curve 1) shows the absorption bands at 525 and 610 nm, the ND-RRPHTh (curve 2) shows the bands at 531, 563 and 611 nm, the ZnO-RRPHTh (curve 3) has the characteristic bands 525 and 610 nm, and the $TiO_2$-RRPHTh (curve 4) blend observes the bands at 365, 495 and 600 nm (Boland, P.; Sunkavalli, S. S.; Chennuri, S.; Foe, K.; Abdel-Fattah, T.; Namkoong, G. *Thin Solid Films*. 2010, 518, 1728-1731; Ram, M. K.; Yavuz, O.; Aldissi, M. *Synthetic Metals*. 2005, 151, 77-84). The optical absorption of the blends corresponds π-π* transition at the range 400-650 nm (Rikukawa, M.; Nakagawa, M.; Ishida, K.; Abe, H.; Sanui, K.; Ogata, N. *Thin Solid Films*. 1996, 284-285, 636-639). There is shift of the RRPHTh (π-π*) band while blending with $TiO_2$, ZnO or ND as compared to pristine RRPHTh, suggesting that the polymer chain packing is perturbed by the incorporation of the nanoparticles.

Figure 2:
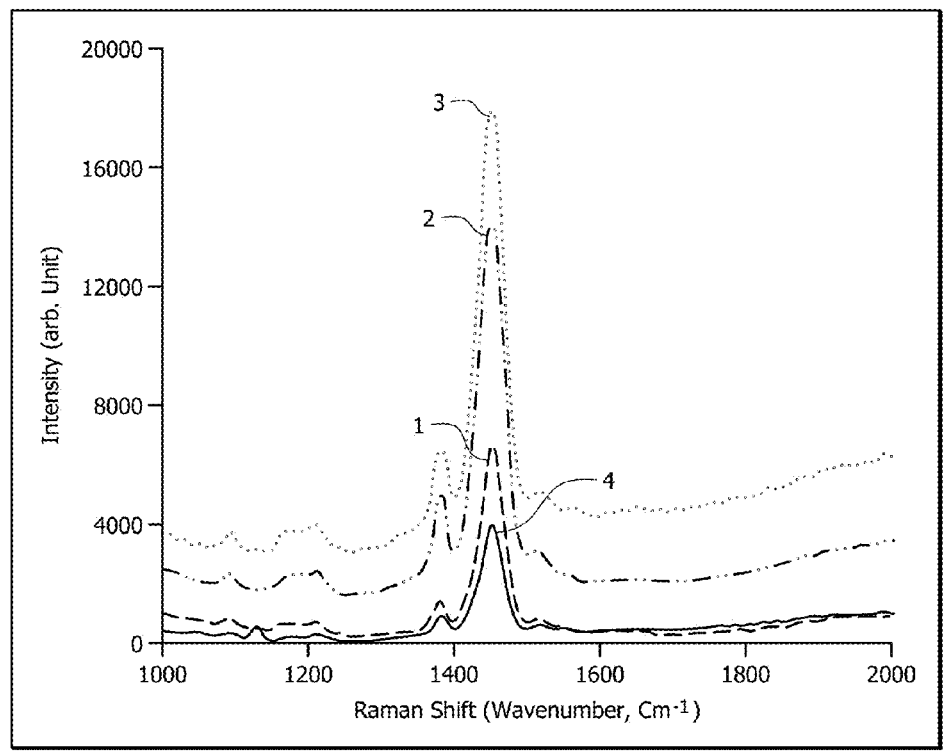
FIG. 2 is a depiction of the Raman shift spectra of RRPHTh (curve 1), ND-RRPHTh (curve 2), ZnO-RRPHTh (curve 3) and $TiO_2$-RRPHTh (curve 4) on silicon substrate.

FIG. 2 shows the Raman spectra of RRPHTh (curve 1), ND-RRPHTh (curve 2), ZnO-RRPHTh (curve 3) and TiO$_2$-RRPHTh (curve 4) on silicon substrate. In FIG. 2, curve 1 shows Raman bands at 1162, 1130, 1221, 1227, 1425, 1453, 1525, 1650 and 1567 cm$^{-1}$. The RRPHTH characteristics peak at 1425 and 1455 cm-1. The signals in the range 1425-1464 cm$^{-1}$ correspond to the symmetric C$_\alpha$=C$_\beta$ stretching deformation, while the medium intensity bands at 1371-1400 cm$^{-1}$ are associated with C$_\alpha$=C$_\beta$ stretching deformations in the aromatic thiophene ring (Motaung, D. E.; Malgasa, G. F.; Arendse, C. J.; Mavundla, S. E.; Knoesen, D. *Mater. Chem. Phys.* 2009, 116, 279-283; Buvat, P.; Hourquebie, P. *Macromolecules.* 1997, 30, 2685-2692). The Raman spectroscopy technique has been used extensively to study RRPHTh as well as nanoparticles material (TiO$_2$, ZnO and diamond) materials, as it is highly sensitive to the different types of carbon bonding. Raman spectroscopy (curve 2) shows the bands at 1059, 1100, 1184, 1199, 1220, 1338, 1391, 1437, 1463 and 1568, 1600-1700 cm-1 for the ND-RRPHTh on nano-hybrid film (e.g., Si substrate). Specially, ND has approximately 50 times greater sensitivity towards sp$^2$ than sp$^3$ carbon bonding, and so it is able to detect even small amounts of non-diamond carbon impurity. A typical Raman spectrum of ND powder is has the characteristics band at 1338 cm$^{-1}$. The broad, asymmetric bands at 1600-1700 cm$^{-1}$ are characteristic of nanocrystalline diamond. In FIG. 2, curve 3 shows the characteristic absorption Raman bands of ZnO-RRPHTh at 1102, 1143, 1185, 120, 1328, 1384, 1452, 1529, 1577 and 1658 cm$^{-1}$. The characteristic band of TiO$_2$-RRPHTh can be found in FIG. 2, curve 4 at 1057, 1137, 1133, 1190, 1233, 1390, 1455, 1526 and 1568 cm$^{-1}$.

It can be seen in FIG. 2 (curves 2-4) that the peak position, corresponding to the symmetric C$_\alpha$=C$_\beta$ stretching deformation, is shifted to a higher wave number (cm$^{-1}$) for the RRPHTh polymer when the polymer is blended with ND, whereas no shift is observed when the polymer was blended with TiO$_2$ and ZnO nanoparticles. A shift in the wave number generally indicates an increase in the crystallinity of RRPHTh polymers and the extension of the effective conjugation length along the polymer backbone for ND-RRPHTh film.

Figure 3:
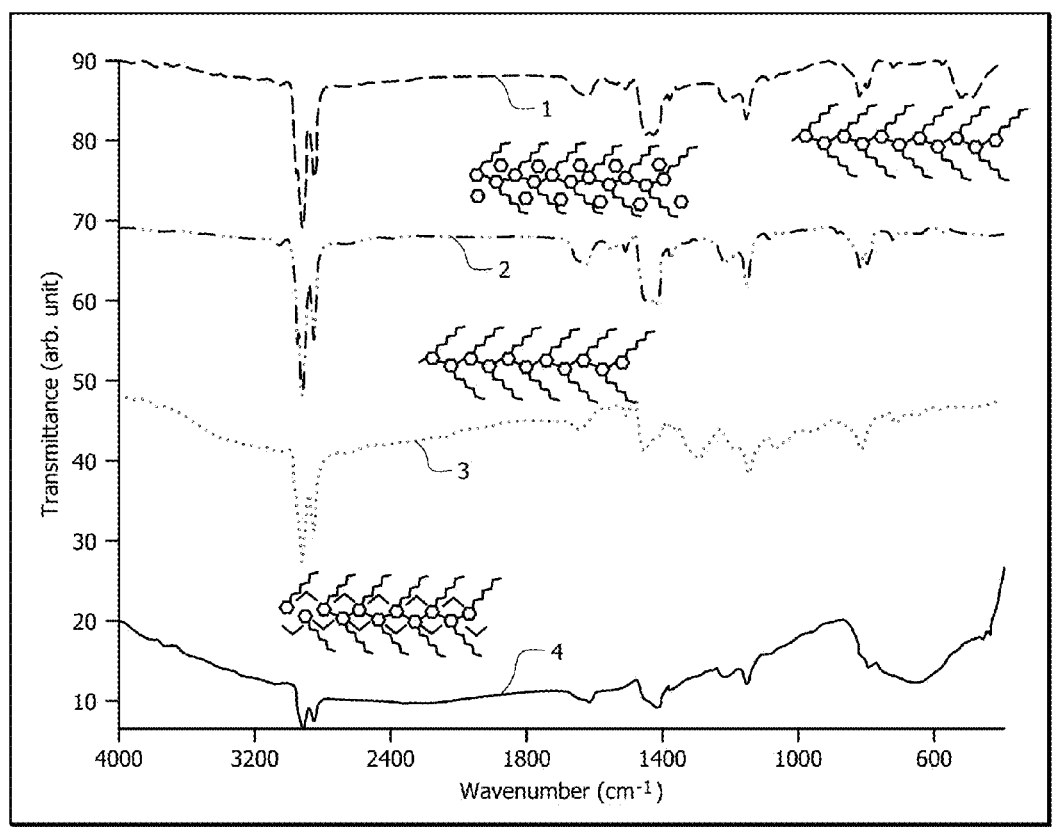
FIG. 3 is a depiction of FTIR spectra of RRPHTh (curve 1), ND-RRPHTh (curve 2), ZnO-RRPHTh (curve 3) and $TiO_2$-RRPHTh (curve 4) film.
Figure 4A:
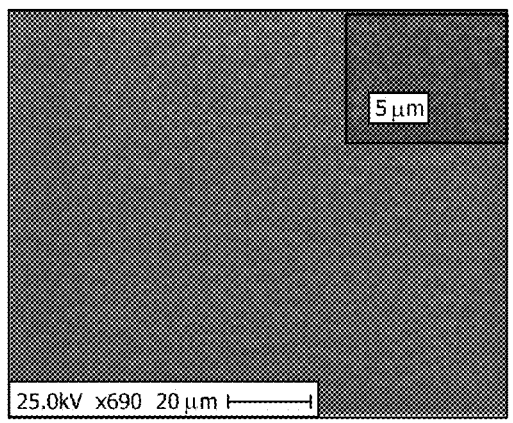
FIG. 4(*a*) is a depiction of SEM images of RRPHTh on silicon substrate
Figure 4B:
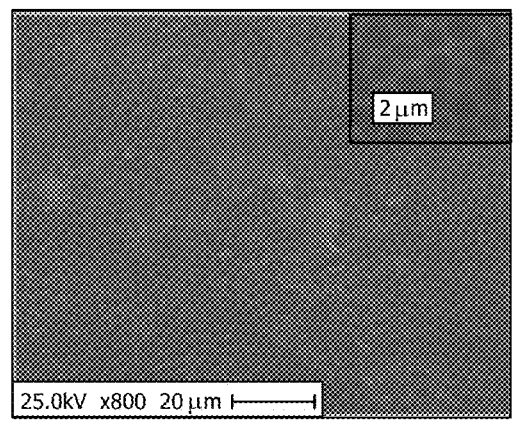
Figure 4C:
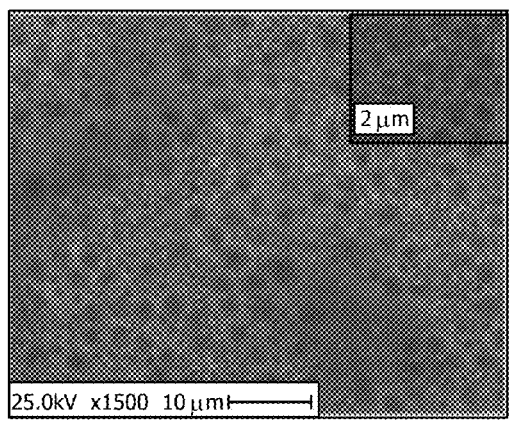
Figure 4D:
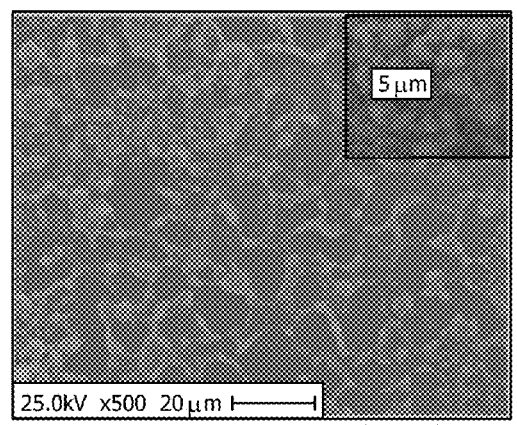

FIG. 3 shows FTIR spectra of RRPHTh (curve 1), ND-RRPHTh (curve 2), ZnO-RRPHTh (curve 3) and TiO$_2$-RRPHTh (curve 4) film. The RRPHTh shows bands at 3200, 3049, 2930, 2870, 2856, 2600, 1648, 1621, 1552, 1506, 1460, 1423, 1377, 1208, 1155, 1079, 822, 718, 724, 648, and 572 cm$^{-1}$ (Yang, H.; Shin, T. J.; Yang, L.; Cho, K.; Ryu, C. Y.; Bao, Z. *Adv. Funct. Mater.* 2005, 15, 671-676; Lu, M.-D.; S. Yang, M. *J. Colloid Interface Sci.* 2009, 333, 128-134; Quist, P. A. C.; Beek, W. J. E.; Wienk, M. M.; Janssen, R. A. J.; Savenije, T. J.; Siebbeles, L. D. A. *J. Phys. Chem. B.* 2006, 110, 10315-10321). The conformation of the side chains was verified by reflectance infrared spectroscopy. In FIG. 3, curve 1 displays the spectra of RRPHTh region (2600-3200 cm$^{-1}$), which features the C—H stretching from CH$_3$ and CH$_2$ groups in the side chains (Ram, M. K.; Sarkar, N.; Bertoncello, P.; Sarkar, A.; Narizzano, R.; Nicolini, C. *Synthetic Metals.* 2001, 122, 369-378). The CH$_3$ asymmetric stretching (va (CH$_3$), 2930 cm$^{-1}$), CH$_2$ asymmetric stretching (va (CH$_3$), 2930 cm$^{-1}$), CH$_3$ symmetric stretching (vs (CH$_3$), 2870 cm$^{-1}$, as a shoulder), and CH$_2$ symmetric stretching (vs (CH$_2$), 2858 cm$^{-1}$). The FTIR spectra of ND-RRPHTh in curve 2 shows the IR bands at 3415 (NH groups), 2089, 1730 (C=O), 1652 (C—O—O—H), 1103 and 620 cm$^{-1}$. Depending on the origin, the nanodiamond surface is often rich in various functional groups. In FIG. 3, curve 3 shows the characteristic ZnO-RRPHTh bands at 3792, 3045, 2953, 2856, 2649, 1621, 1552, 1448, 1423, 1215, 1155, 1082, 822, 800, 726, 648, 525 and 495 cm'. The FTIR bands of TiO$_2$-RRPHTh film (curve 4) at 3852, 3753, 3042, 2907, 2857, 2327, 1621, 1530, 1454, 1515, 1370, 1244, 1154, 1086, 797, 656 and 442 cm$^{-1}$. However, compared with the bulk crystalline sample, the peak positions of both the va (CH$_2$) and the vs (CH$_3$) stretching of the films are blue shifted. The blue shift of CH$_2$ stretching vibrations indicates the existence of disorders in hydrocarbon chains in ZnO and TiO$_2$ blending. Therefore, the side chains in all the ZnO-RRPHTh and TiO$_2$-RRPHTh films are less ordered than those of the bulk crystalline RRPHTh, which is often due to the existence of gauche conformation defects due to presence of nanoparticles. Whereas, ND-RRPHTH shows the red shift of both the va (CH$_2$) and the vs (CH$_3$) stretching of the films indicating the better crystallinity in the ND-RRPHTh film.

Example 3

Surface Characterization

The hybrid morphology and size of the RRPHTh films blended with nanomaterials were investigated by field emission scanning electron microscopy (FESEM) (JEOL 6340F, operated at 5 kV). Molecular level morphology was investigated using high-resolution transmission electron microscopy (HRTEM) (JEOL 3011 operated at 300 kV).

The film of hybrid morphology of the RRPHTh alone and RRPHTh with nanomaterials fabricated on SEM was used to measure the SEM studies. FIG. 4(a)-(d) shows the SEM pictures of RRPHTh, ND-RRPHTh, ZnO-RRPHTh, and TiO$_2$-RRPHTh, respectively. It is well known that both the processing methods and the type of solvent used play a critical role both on the degree of organization of conjugated polymer. The SEM analysis does not provide any information on the topography (i.e. height and phase images) of the samples. The RRPHTh picture 4a shows the simple aggregation of the RRPHTh polymer when chloroform was evaporated. The larger-scale roughness may reflect the formation of a gel phase during solvent removal that subsequently collapses to an extent governed by the final polymer content of the film. The hexagonal arrangement of RRPHTh with ND can been observed in FIG. 4(b) (Motaung, D. E.; Malgas, G. F.; Arendse, C. J.; Malwela, T. *Mater. Chem. Phys.* 2010, 124, 208-216). This observation suggests that the relative roughness of the nano-hybrid films is attributed to the influence of a strong ND interaction with RRPHTh, ZnO-RRPHTh blend has also shown some degrees of arrangement whereas as more agglomeration would be expected for blends of TiO$_2$ in RRPHTh. Moreover, no sequential arrangement with TiO$_2$ nanoparticles intermixing is achieved independently, as was evidenced on the scanning electron microscopy (SEM). Nevertheless, the SEM investigations suggest that a reasonable polymer-nanoparticles intermixing is achieved independently of the blend roughness, fir all type of nanoparticles.

The nanostructural characterization of the nanocrystalline films has therefore been employed here to elucidate film morphology using transmission electron microscopy (TEM). TEM micrographs of the RRPHTh films are shown in FIGS. 5(a)-(b), and TEM micrographs of the ND-RRPHTh nano-hybrid films are shown in FIGS. 5(c)-(d). FIG. 5(a)-(b) show TEM images of the simple aggregation and crystallization of the RRPHTH polymer after chloroform was evaporated, from which the measured average crystallite size was found to be between 7 and 12 nm in the lattice. FIGS. 5(c)-(d) are bright-field transmission electron micrographs of a film with a uniform distribution of ND nanoparticles in the RRPHTh conducting polymer at two different scales. Although lattice images reveal individual crystallites at atomic resolution, further TEM analysis of the ND-RRPHTh evidenced that the ND nanoparticles are encapsulated within the RRPHTh polymeric structures. The ND-RRPHTh particle size of 20-100 nm is larger than the ND nanoparticles precursor, indicating that hybrid occurs by aggregation of few nanoparticles of ND. FIG. 5(d) shows a high resolution TEM of ND-RRPHTH nanocomposite, where aggregated individual ND particles have been characterized.

Figure 6B:
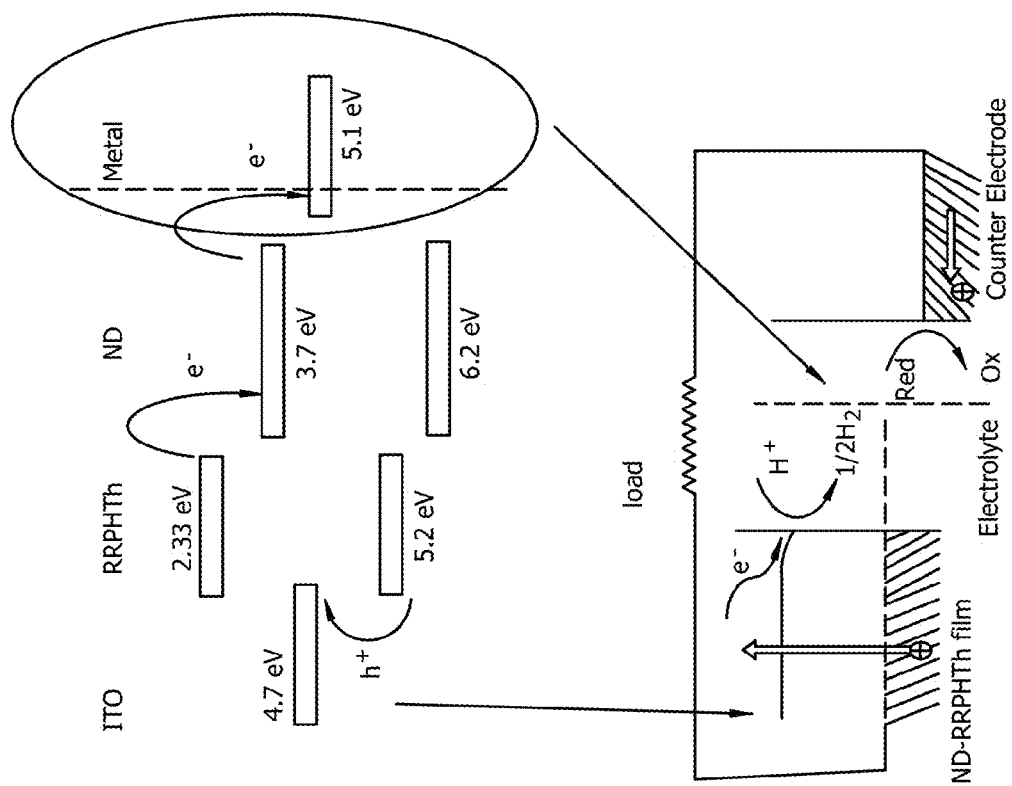
FIG. 6(b) is a depiction of the energy band diagram and possible redox process in photoelectrochemical cell of ND-RRPHTh film.
Figure 6A:
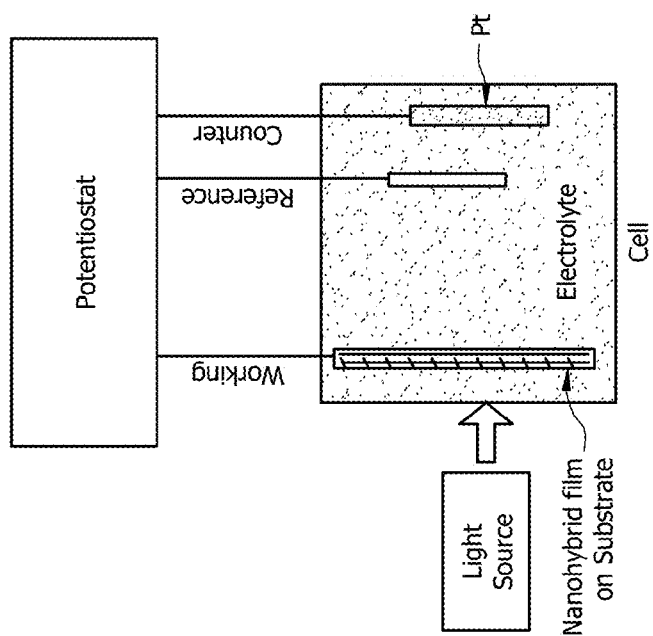
FIG. 6(a) is a depiction of an electrochemical cell with a nano-hybrid film on substrate.

FIG. 6(a) shows the schematic of electrochemical cell and set up thereof. FIG. 6(b) shows the energy band diagram and the possible redox process in photoelectrochemical cell of ND-RRPHTh film. The energy band diagram depicts $TiO_2$ and ZnO each with RRPHTh-ITO in the generation of photocurrent with respect to ND (Qiao, Q.; Lianyoung, S.; Beck, J.; McLeskey, J. T. *J. Appl. Phys.* 2005, 98, 094906; Lyon, J. E.; Cascio, A. J.; Beerbom, M. M.; Schlaf, R.; Zhu, Z.; Jenekhe, S. A. *Appl. Phys. Lett.* 2006, 88, 222109; Huang, Z.; Zhang, J.; Yang, X.; Cao, W. *J Inorg Organomet Polym.* 2010, 20, 161-167; Huang, Z.; Zhang, J.; Yang, X.; Cao, W. *J Mater Sci: Mater Electron.* 2010, 21, 1137-1143).

Example 4

Electrochemical Characterization

The electrochemical measurements were carried out using a Potentiostat/Galvanostatic (Voltalab). A standard three electrode configuration was employed, where a glass/ITO/ nano-hybrid films acted as a working electrode, a platinum wire as the counter electrode, and Ag/AgCl as the reference electrode. The reference for the absorbance was a naked ITO-coated glass plate in the corresponding electrolyte.

Figure 7:
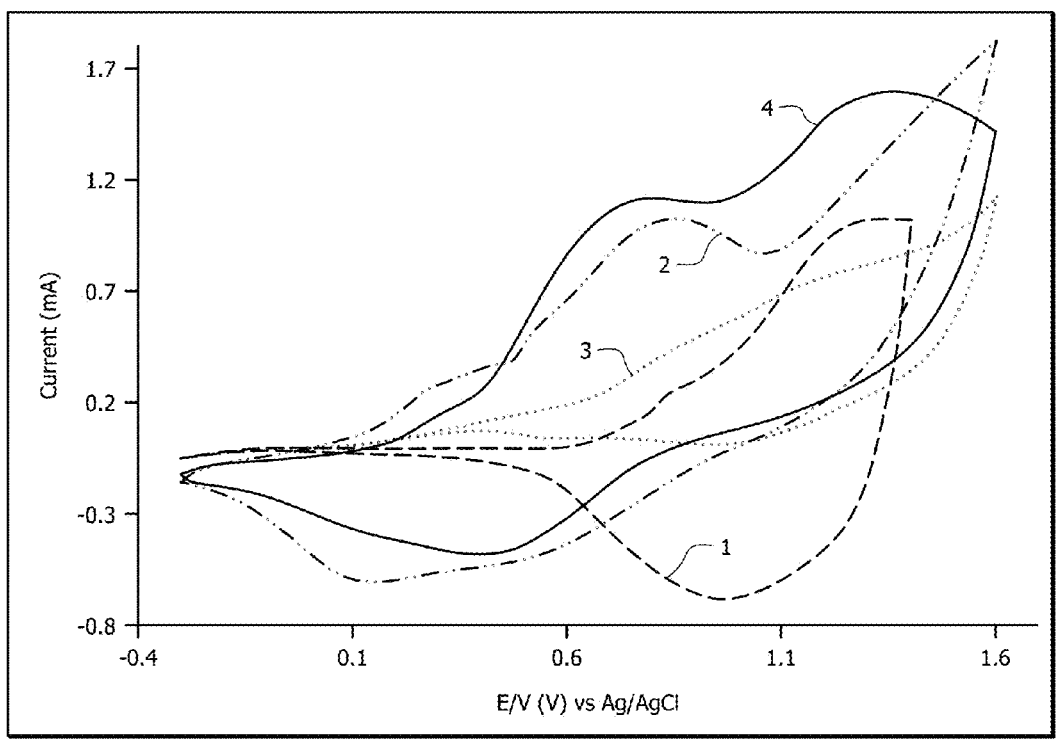
FIG. 7 is a depiction of CV of RRPHTh (curve 1), ND-RRPHTh (curve 2), ZnO-RRPHTh (curve 3) and TiO$_2$-RRPHTh (curve 4) deposited ITO coated glass plate as working electrode, Ag wire as reference and Platinum as counter electrode in 0.1 M TBATFB in acetonitrile solution.
Figure 8A:
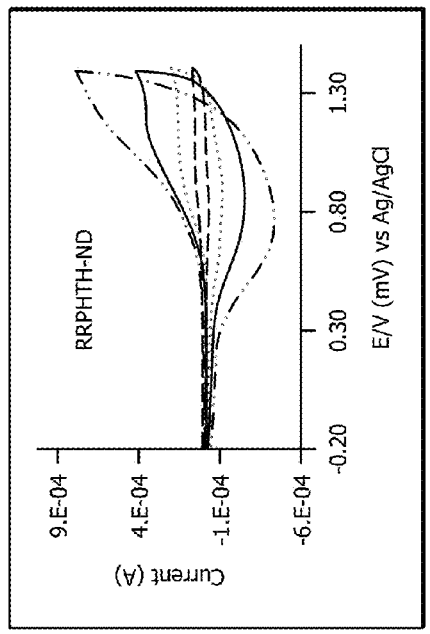
FIG. 8(a) is a depiction of CV of RRPHTh deposited ITO coated glass plate as working electrode, Ag wire as reference and Platinum as counter electrode in 0.1 M TBATFB in acetonitrile solution.
Figure 8B:
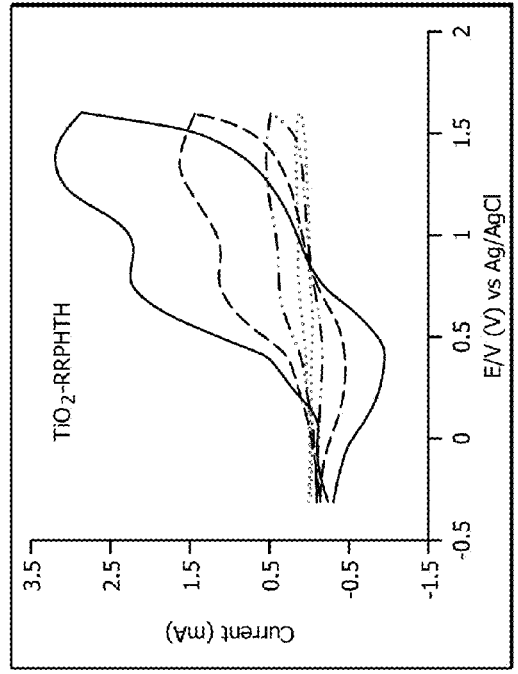
FIG. 8(b) is a depiction of CV of ND-RRPHTh deposited ITO coated glass plate as working electrode, Ag wire as reference and Platinum as counter electrode in 0.1 M TBATFB in acetonitrile solution.
Figure 8C:
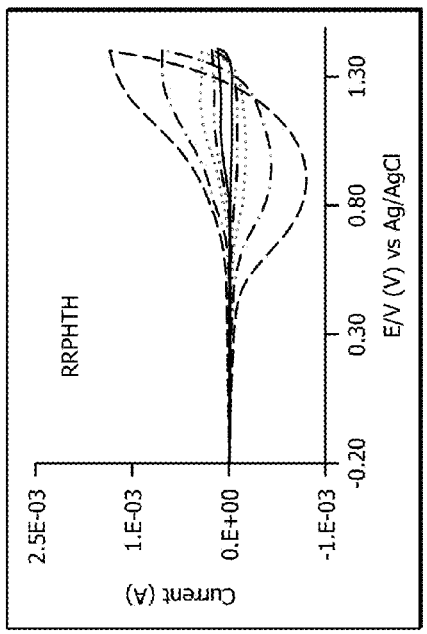
FIG. 8(c) is a depiction of CV of ZnO-RRPHTh deposited ITO coated glass plate as working electrode, Ag wire as reference and Platinum as counter electrode in 0.1 M TBATFB in acetonitrile solution.
Figure 8D:
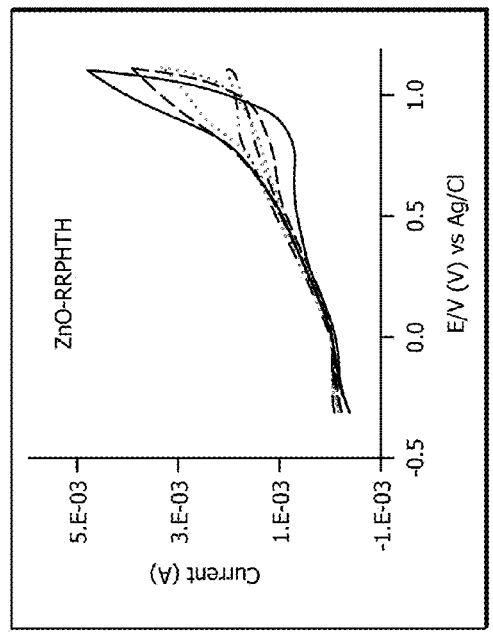
FIG. 8(d) is a depiction of CV of TiO$_2$-RRPHTh deposited ITO coated glass plate as working electrode, Ag wire as reference and Platinum as counter electrode in 0.1 M TBATFB in acetonitrile solution.

FIG. 7 (curves 1-4) shows the cyclic voltammogram behavior of RRPHTH (curve 1), ND-RRPHTh (curve 2), ZnO-RRPHTh (curve 3) and $TiO_2$-RRPHTh (curve 4) in dry acetonitrile/0.1 M TBATFB in three electrode configurations as working electrode, Pt as counter electrode and Ag as quasi-reference electrode. FIG. 7 (curve 1) shows the oxidation peaks at 0.84 V and 1.23V, and reduction peaks at 0.98 V and 1.21V. The ND-RRPHTH film (curve 2) reveals the oxidation peaks at 0.24V, 0.33V, 0.54V and 0.80 V with the reduction potential at 0.14V, 0.46V and 1.17V The cyclic voltammogram has shown reversibility. The shoulder at 1.21V could be due to the oxidation of RRPHTh (Yamamoto, T.; Honda, Y.; Sata, T.; Kokubo, H. *Polymer.* 2004, 45, 1735-1738). The redox process of the polymer is chemically reversible, as the amount of the cathodic charge is essentially the same as the anodic charge. Both anodic and cathodic peaks are quite broad, which is likely caused by the slow diffusion of the dopant anions (TBATFB or $BF_4^{-1}$) in and out of the film. The peak-to-peak separation $\Delta Ep$ is 4 mV for ND-RRPHTh, whereas there is only a 2 mV peak-to-peak separation in the RRPHTh. ND-RRPHTh has shown redox potential due to the presence of ND nanoparticles. Curve 3 of FIG. 6 shows the oxidation peaks for ZnO-RRPHTh at 0.82V and 1.15V, and reduction peaks at 0.55V, 0.99V and 1.3V. Curve 4 of FIG. 6 shows redox peaks of $TiO_2$-RRPHTh at 0.27V, 0.725V, 1.31V, 0.44V and 1.13V. The peak-to-peak separation is due to surface confined species.

To understand that the electrochemical properties are diffusion controlled systems, the CVs of RRPHTh, ND-RRPHTh, ZnO-RRPHTh and $TiO_2$-RRPHTh at different scan rate (5, 10, 20, 50, 100 mV/sec) in TBATBF (tetra-butyl-ammonium-tetrafluoroborate) electrolyte are shown in FIGS. 8(a)-(d), respectively. The CV is reversible regardless of the presence of different types of nanoparticles blending with RRPHTh. Since polythiophenes typically undergo chemical and electrochemical oxidation to accept one-electron oxidation per about 5 units of the thiophene ring, the linear correlation between maximum redox peak, current (ipa) and square root of potential $v^{1=2}$ (not shown in figure) suggests that diffusion of the RRPHTh molecule to the surface area of the platinum electrode is an important factor to determine ipa, similar to cases of electrochemical reactions of low molecular compounds. A linear relationship was observed between the anodic peak current and the scan rate (not shown in figures). The characteristic of an electro-active polymer film is a diffusion controlled system.

Figure 9:
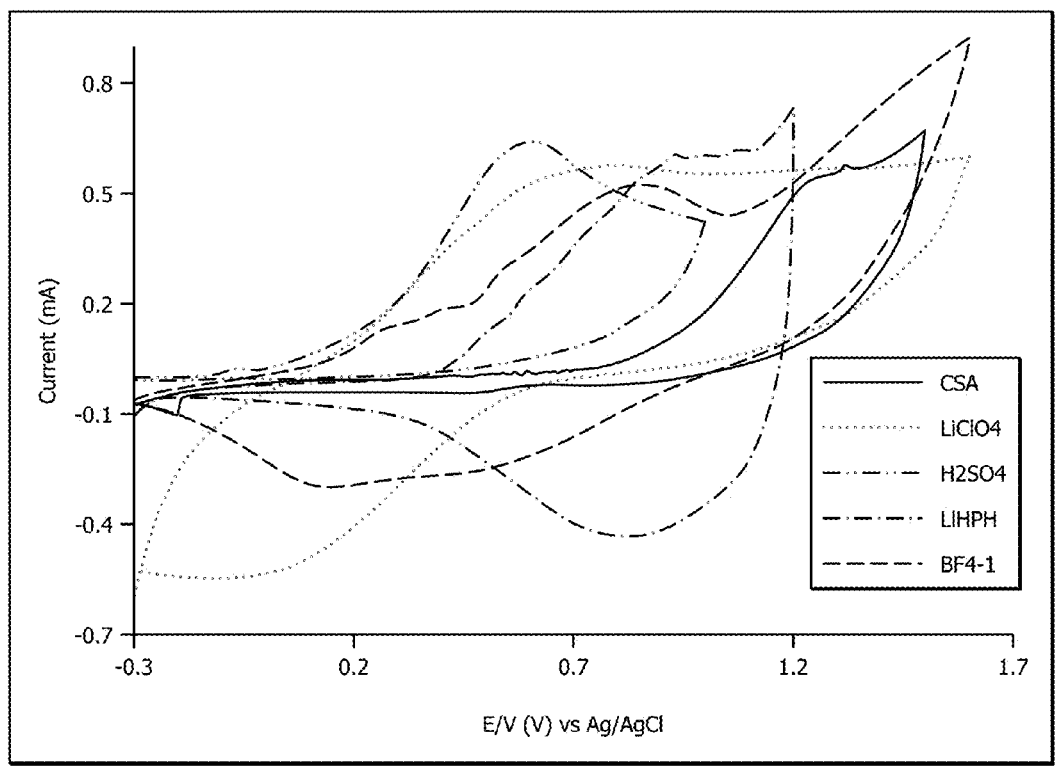
FIG. 9 is a depiction of the CV of NDs-RRPHTH in 0.1 M concentration of acid in Ag/AgCl reference.
Figure 10A:
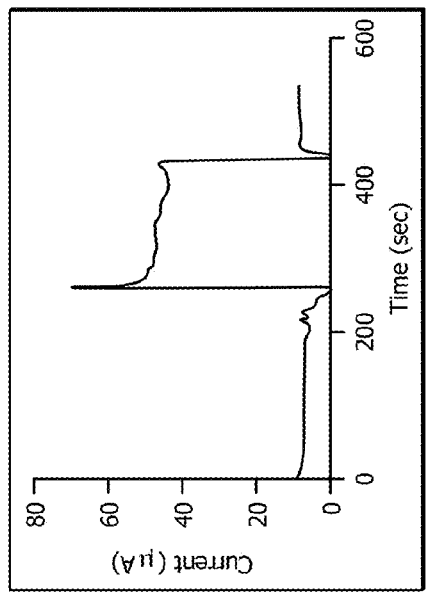
FIG. 10(a) is a depiction of the photoelectrochemical current obtained from RRPHTH film deposited on ITO coated glass plate as working electrode at no applied potential. A 60 Watt bulb was switched on and off for the films in electrolyte containing TBATFB, Ag wire as reference electrode and Pt as counter electrode.
Figure 10B:
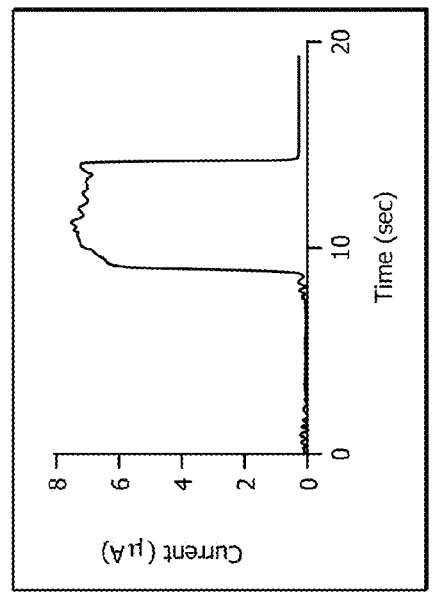
FIG. 10(b) is a depiction of the photoelectrochemical current obtained from ND-RRPHTH nano-film deposited on ITO coated glass plate as working electrode at no applied potential. A 60 Watt bulb was switched on and off for the films in electrolyte containing TBATFB, Ag wire as reference electrode and Pt as counter electrode.
Figure 10C:
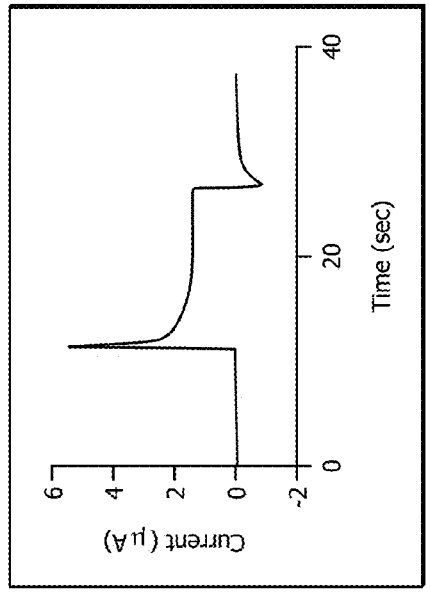
FIG. 10(c) is a depiction of the photoelectrochemical current obtained from ZnO-RRPHTH nano-film deposited on ITO coated glass plate as working electrode at no applied potential. A 60 Watt bulb was switched on and off for the films in electrolyte containing TBATFB, Ag wire as reference electrode and Pt as counter electrode.
Figure 10D:
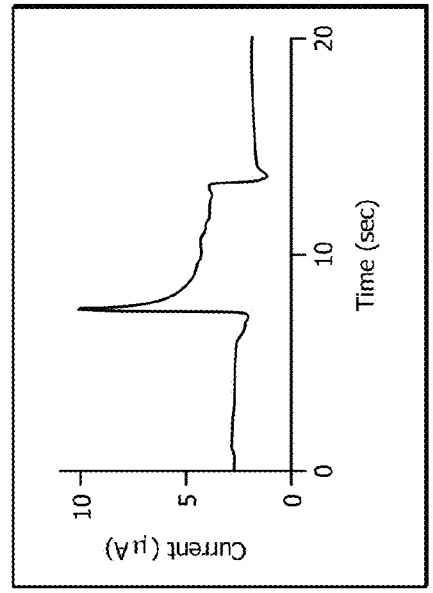
FIG. 10(d) is a depiction of the photoelectrochemical current obtained from TiO$_2$-RRPHTH nano-film deposited on ITO coated glass plate as working electrode at no applied potential. A 60 Watt bulb was switched on and off for the films in electrolyte containing TBATFB, Ag wire as reference electrode and Pt as counter electrode.
Figure 11A:
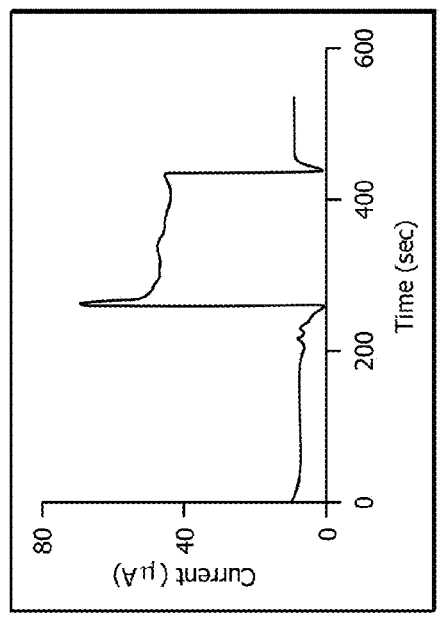
FIG. 11(a) is a depiction of the photoelectrochemical current obtained from ND-RRPHTh film deposited on ITO coated glass plate as working electrode at no applied potential. A 60 Watt bulb was switched on and off for the films at electrolyte containing CSA, Ag wire as reference electrode and Pt as counter electrode.
Figure 11B:
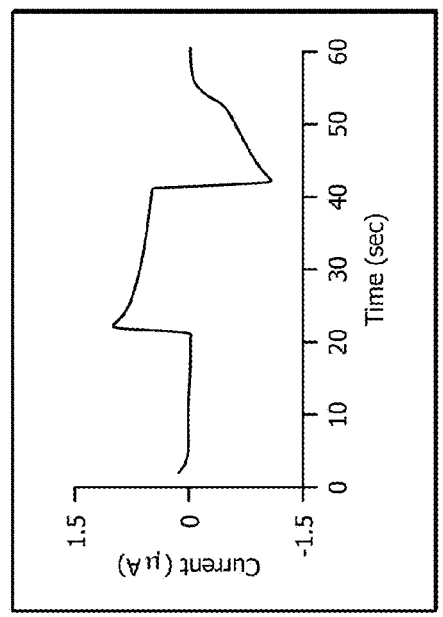
FIG. 11(b) is a depiction of the photoelectrochemical current obtained from ND-RRPHTh film deposited on ITO coated glass plate as working electrode at no applied potential. A 60 Watt bulb was switched on and off for the films at electrolyte containing TBATFB, Ag wire as reference electrode and Pt as counter electrode.
Figure 11C:
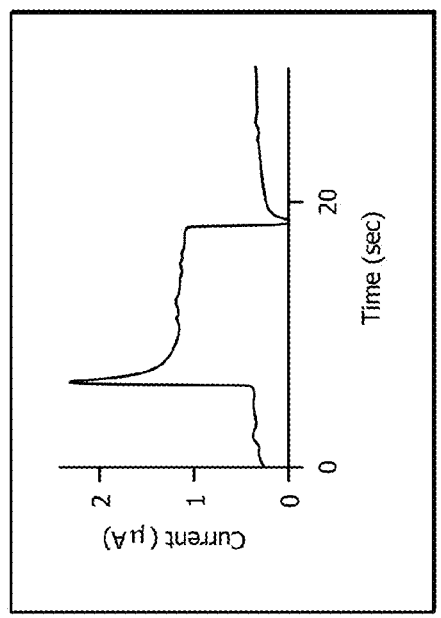
FIG. 11(c) is a depiction of the photoelectrochemical current obtained from ND-RRPHTh film deposited on ITO coated glass plate as working electrode at no applied potential. A 60 Watt bulb was switched on and off for the films at electrolyte containing LiClO$_4$, Ag wire as reference electrode and Pt as counter electrode.
Figure 11D:
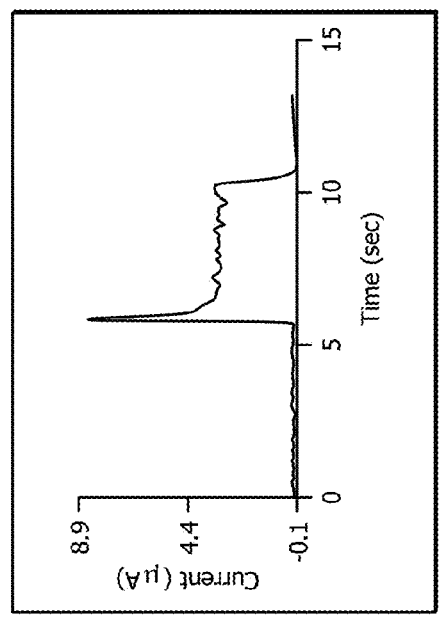
FIG. 11(d) is a depiction of the photoelectrochemical current obtained from ND-RRPHTh film deposited on ITO coated glass plate as working electrode at no applied potential. A 60 Watt bulb was switched on and off for the films at electrolyte containing HCl, Ag wire as reference electrode and Pt as counter electrode.

FIG. 9 shows CV of ND-RRPHTh on ITO coated glass plate as a working electrode, platinum as a counter electrode, and Ag wire as a quasi-reference electrode in CSA, $LiClO_4$, $H_2SO_4$, Lithium hexaphosphate (LiHPH), and TBATFB electrolytes. It is evident that the nature of the solvent plays a significant role in the mechanism of oxidation (Le're-Porte, J.-P.; Moreau, J. J. E.; Torreilles, C. *Eur. J. Org. Chem.* 2001, 7, 1249-1258). The RRPHTh CV shows redox peaks at 0.68V, 1.23V, 1.07 B, and 0.06V, whereas ND-RRPHTh shows quasi-reversible state showing the oxidation peak at 0.56V. The ND-RRPHTh shows peaks at 0.9V and 0.88V due to the presence of LiHPH. The ND-RRPHTh films reveal interesting redox systems due to the presence of several redox potentials.

Further photoelectrochemical studies were performed in an electrolyte containing salt such as TBATFB. FIGS. 10(a)-(d) shows the photoelectrochemical current obtained from RRPHTH, ND-RRPHTh, ZnO-RRPHTh and $TiO_2$-RRPHTH nano-hybrid film, respectively, deposited on ITO coated glass plate as working electrode, Pt as a counter electrode, and Ag wire as reference electrode in TBATFB electrolyte. The electrochemical photo response was switched on/off by a 60 W lamp. The excitons in RRPHTh undergo charge separation, and the electrons and holes are driven in the opposite direction for their collection at the electrode surface. The nano-hybrid ND-RRPHTh film accepts the electron as soon as the electron hole pairs are generated due to excitons leaving the hole and moving to another electrode. Subsequently, the electron moves from the electrolyte to the other electrode.

The ND-RRPHTh nano-hybrid film on n-type Si shows maximum photo-conversion efficiency. The photoelectrochemical properties of ND-RRPHTh deposited on either n-type silicon or ITO coated glass plate in TBATFB containing electrolyte is around 8 to 10 times higher in current density and energy conversion efficiencies, as compared to RRPHTh, ZnO-RRPHTH and $TiO_2$-RRPHTh nano-hybrid films. The ND-RRPHTh hybrid provides percolating channels for the holes to transport to the electrode. The ND C60 layer acts as both electron acceptor and electron transporting layer to increase the mobility for carrier transport. The devices were fabricated on ITO coated glass substrate. The ND-RRPHTh film shows current around 70 μA while compared to RRPHTh, ZnO-RRPHTh, and $TiO_2$-RRPHTh with approximate values of 5 μA, 9 μA, and 7 μA, respectively, when a 60 Watt bulb was switched on and off for the films in a electrolyte containing TBATFB, Pt as counter electrode in a photoelectrochemical cell and Ag wire as reference electrode.

FIG. 11 shows photoelectrochemical current obtained from ND-RRPHTH nano-hybrid film deposited on ITO coated glass plate at no applied potential. The 60 W bulb was switched on and off for the films at different electrolytes: (a) CSA, (b) TBATFB (c) $LiClO_4$ and (d) HCl. Unexpectedly, the TBATFB containing electrolyte has showed the highest current for ND-RRPHTh film. As discussed, the film also has properties of reversible electrochemistry.

Figure 12:
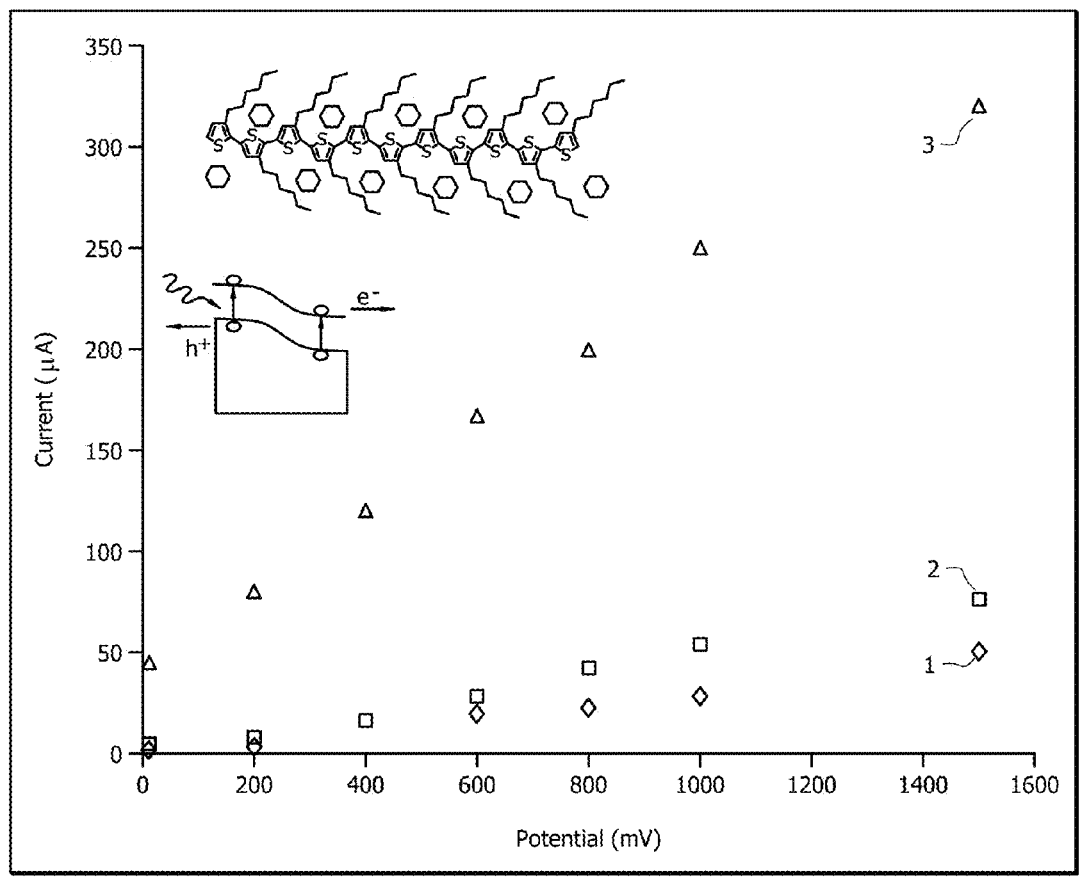
FIG. 12 is a depiction of photoelectrochemical response time response of ND-RRPHTH in different electrolytes, (1) CSA, (2) LiClO$_4$, and (3) TBATFB.

FIG. 12 reveals the photoelectrochemical response time response of ND-RRPHTh in different electrolytes: (1) CSA, (2) LiClO$_4$ and (3) TBATFB as a function of the applied potential. The different potential was applied, and the photocurrent of ND-RRPHTh was measured, showing that TBATFB containing electrolyte has larger current than CSA and LiClO$_4$ containing electrolytes.

Figure 13A:
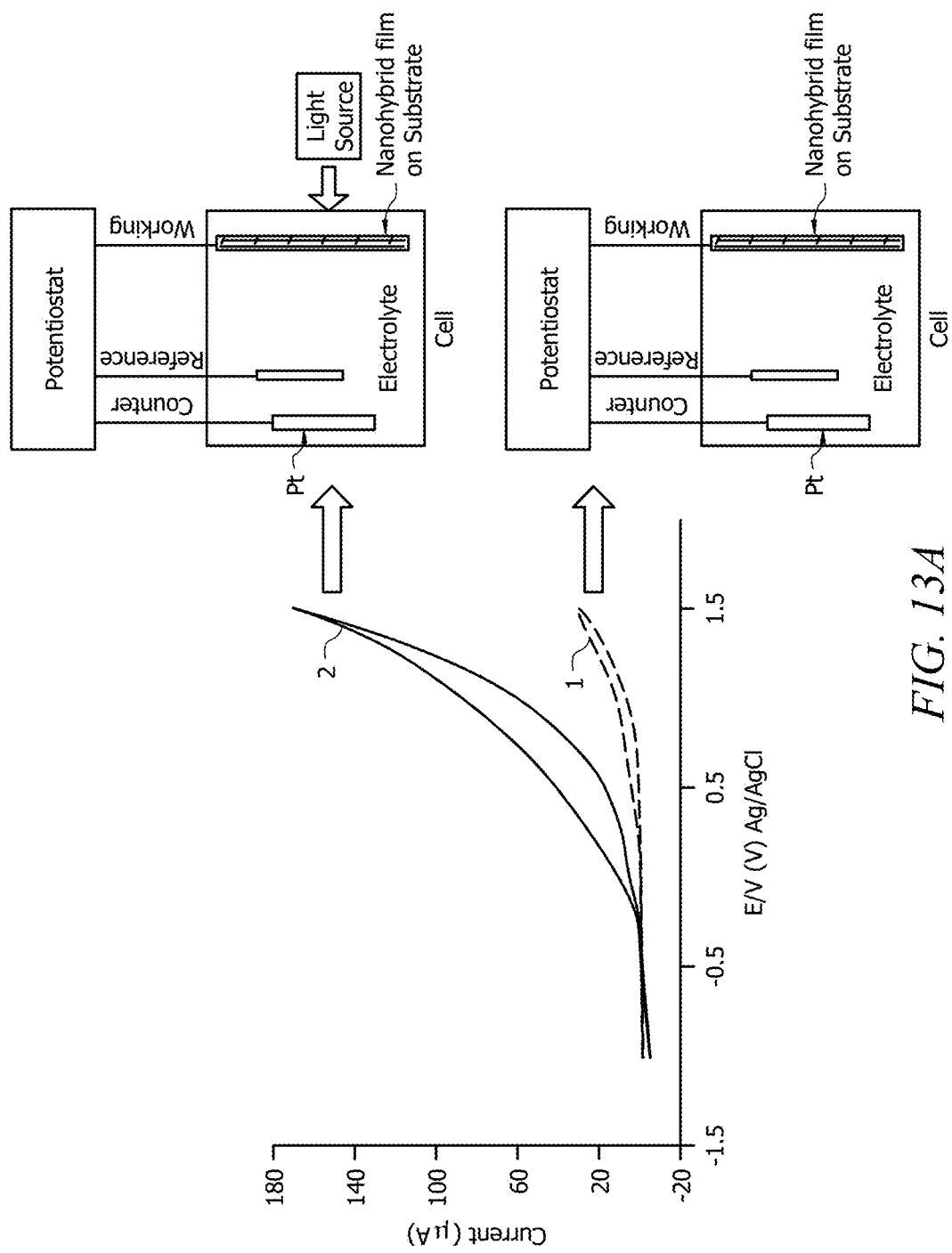
FIG. 13(a) is a depiction of CV response of ND-RRPHTh film deposited on two different substrates in BF4-containing electrolyte and a gold electrode. Curve 1 represents the CV without light exposition, and curve 2 shows the CV when a 60 Watt bulb was illuminated and the cyclic voltammogram was observed.
Figure 13B:
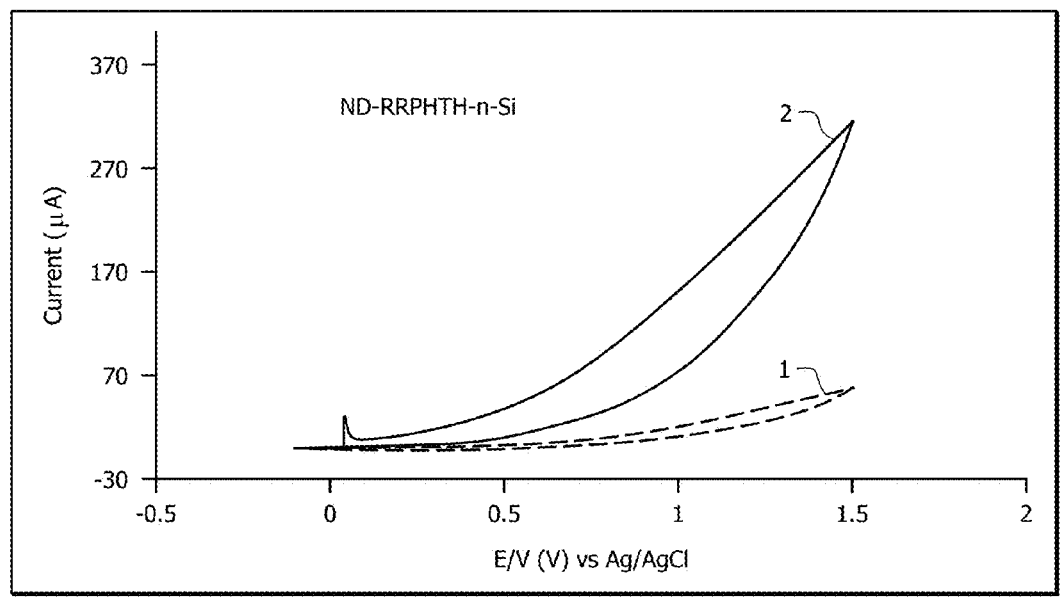
FIG. 13(b) is a depiction of CV response of ND-RRPHTh film deposited on two different substrates in BF4-containing electrolyte and an n-type Si substrate. Curve 1 represents the CV without light exposition, and curve 2 shows the CV when a 60 Watt bulb was illuminated and the cyclic voltammogram was observed.

The effect of substrate on nano-hybrid RRPHTh is shown in FIGS. 13(a)-(b). The film was deposited on n-type Si and Ag electrodes. The CVs was studied from −2V to 1.5V showing the reversible systems. In FIG. 13, curve 1 represents the CV without light exposition, and curve 2 shows the CV when the 60 Watt bulb was illuminated and the cyclic voltammogram was observed. The increase of cyclic voltammogram current at all measured potential was unexpectedly reversible.

Nano-hybrid films of ND-RRPHTh, ZnO-RRPHTh, and TiO$_2$-RRPHTh on ITO coated glass plate, n-type Si and Ag coated glass surface were fabricated and characterized using a combination of physical and electrochemical techniques. Embodiments of the current invention show the unexpected photo-electrochemical properties of blended ND-RRPHTh nano-hybrid films. It has been demonstrated that the incorporation of small quantities of nanodiamond synergistically enhances photoconductivity in RRPHTh polymers. The photoelectrochemical properties of ND-RRPHTh deposited on either n-type Si or ITO coated glass plate in TBATFB electrolyte is around 8 to 10 times higher in current density and energy conversion efficiencies, as compared to conventional RRPHTh, ZnO-RRPHTh, and TiO$_2$-RRPHTh nano-hybrid films.

Example 5

Polymer hybrid films were created with nanodiamond for photoelectrochemical cell applications. Different ratios of nanodiamond were fabricated with RRPHTh and P3OT polymers to understand the organic photovoltaic cell. Substituted composite polythiophenes were synthesized. In order to fully exploit the advantages of polythiophenes in blend structures, the blend RRPHTh with ND, ZnO, and TiO$_2$ nanoparticles in organic solvent were made. The characterization (i.e., characterization techniques such as Scanning electron microscopy, Atomic force microscopy, FTIR, RAMAN, UV-Vis, electrochemical) were performed in nano-hybrid structures of polythiophenes with nanodiamond blends. The morphology, structure, optical, electrochemical and photoelectrochemical properties of nano-hybrid RRPHTh films deposited on different substrates were investigated. The electrochemical and photochemical properties of ND-RRPHTh hybrid film deposited on ITO coated glass plate, n-type silicon substrates, and gold coated glass surfaces were investigated in different electrolytes. Enhanced photoelectrochemical properties of polythiophenes-nanodiamond deposited on n-type silicon were achieved in terms of current density and energy conversion efficiencies. The solid photovoltaic cell was also fabricated on ND-polythiophene based structured materials. This conjugated polymer blending with nanomaterials presented unexpected photo-conversion properties, which can be exploited for various photo-energy applications.

Nano-hybrid film of conducting polymer with nanodiamond showed the regular hexagonal arrangement of RRPHTh with ND. The hybrid particle size of 20 nm-100 nm was larger than the ND nanoparticles precursor, indicating that hybridization occurs by the aggregation of few nanoparticles of ND in blend structure. The UV-Vis study showed that there was a shift of the RRPHTh (π-π*) band while blending with ND, ZnO, or TiO$_2$ when compared to pristine RRPHTh, suggesting that the polymer chain packing was perturbed by the incorporation of the nanoparticles. The shift in Raman band in blend showed that the extension of the effective conjugation length along the polymer backbone for nano-hybrid film based on nanodiamond polythiophenes hybrid structures. The photoelectrochemical properties of ND-RRPHTh deposited on either n-type silicon or ITO coated glass plate in TBATFB electrolyte was around 8 to 10 times higher in current density and energy conversion efficiencies as compared to RRPHTh, ZnO-RRPHTh, and TiO$_2$-RRPHTh nano-hybrid films. The ND-RRPHTh nano-hybrid films provided percolating channels for holes transport to the electrode. The ND-RRPHTh film provided current around 70 µA, whereas RRPHTh, ZnO-RRPHTh, and TiO$_2$-RRPHTh provided current around 5 µA, 9 µA, and 7 µA, respectively, when a 60 Watt bulb was switched on and off for the films in an electrolyte containing TBATFB, Ag wire was used as reference electrode and Pt was used as counter electrode in a photoelectrochemical cell. Similar results were also observed for P3OT-ND film. The synthesis parameters of substituted polythiophenes are understood and can be variable.

Example 6

The nanoparticles (ND, ZnO, and TiO$_2$) and RRPHTh were mixed at 1:1 ratio in chloroform solvent. Initially, 1 g of RRPHTh was dissolved in 100 ml chloroform for 5-6 hours, and then equal weight of each nanoparticle was separately dissolved in the RRPHTh/chloroform solution. Similarly, 1 g of P3OT was dissolved in 100 ml chloroform 6 hours, and equal weight of nanodiamond is dissolved in the P3OT/chloroform solution. The mixture was stirred for 48 hours at room temperature. Care must be taken since the longest stirred solutions have shown the optimum physical properties of blend films. The resulting solution containing RRPHTh with nanoparticles were deposited on indium tin oxide (ITO) coated glass plates, n-type silicon, and gold coated glass substrates using solution cast and spin coating techniques in a thickness range varying from 500 nm-1 µm in average measured by stylus profiler.

Various techniques have been used for characterization of hybrid structures (Ding, H.; Ram, M. K.; Nicolini, C. *Synthetic Metals.* 2001, 118, 81-88; Valter, B.; Ram, M. K.; Nicolini, C. *Langmuir.* 2002, 18, 1535-1541; Ram, M. K.; Sarkar, N.; Bertoncello, P.; Sarkar, A.; Narizzano, R.; Nicolini, C. *Synthetic Metals.* 2001, 122, 369-378; Ding, H.; Ram, M. K.; Nicolini, C. *J. Nanosci. Nanotechnol.* 2001, 1, 207-213; Ding, H.; Ram, M. K.; Zheng, L.; Nicolini, C. *J. Mater. Chem.* 2001, 36, 5423-5428). The electrochemical studies were performed in electrolytes, 0.1 M HCl, 0.1 M H$_2$SO$_4$, 0.1 M LiClO$_4$ in propylene carbonate, 0.1 M CSA+water, and 0.1 TBATFB in ACN. The electrochemical cell contained films coated on the substrates acting as working electrodes, Pt as a counter electrode, and Ag/AgCl as a reference electrode for water based electrolytes, whereas silver wire was used as a reference electrode for non-aqueous electrolytes. The photoelectrochemical properties of the ND-RRPHTh, ZnO-RRPHTh and TiO$_2$-RRPHTh nano-hybrid films in different electrolytes were studied using a 60 W lamp illuminated from a distance of about 5 cm away from the working electrode. The switching on/off action from the visible light was controlled manually.

The UV-visible absorption spectra of RRPHTh, ND-RRPHTh, ZnO-RRPHTh, and TiO$_2$-RRPHTh are shown in FIG. 1. The RRPHTh (curve 1) reveals the absorption bands at 525 and 610 nm, ND-RRPHTh (curve 2) shows the bands at 531, 563 and 611 nm (Boland, P.; Sunkavalli, S. S.; Chennuri, S.; Foe, K.; Abdel-Fattah, T.; Namkoong, G. *Thin Solid Films*. 2010, 518, 1728-1731; Ram, M. K.; Yavuz, O.; Aldissi, M. *Synthetic Metals*. 2005, 151, 77-84). The ZnO-RRPHTh shown in Figure (curve 3) has the characteristic bands at 525 and 610 nm. The $TiO_2$-RRPHTh blend (curve 4) show the bands at 365, 495 and 600 nm (Boland, P.; Sunkavalli, S. S.; Chennuri, S.; Foe, K.; Abdel-Fattah, T.; Namkoong, G. *Thin Solid Films*. 2010, 518, 1728-1731; Ram, M. K.; Yavuz, O.; Aldissi, M. *Synthetic Metals*. 2005, 151, 77-84). The optical absorption of the blends corresponds to $\pi$-$\pi$* transition at the range 400-650 nm (Rikukawa, M.; Nakagawa, M.; Ishida, K.; Abe, H.; Sanui, K.; Ogata, N. *Thin Solid Films*. 1996, 284-285, 636-639). There is a shift of the RRPHTh ($\pi$-$\pi$*) band while blending with ND, ZnO, or $TiO_2$ suggesting that the polymer chain packing is perturbed by the incorporation of the nanoparticles when compared to pristine RRPHTh.

Figure 14:
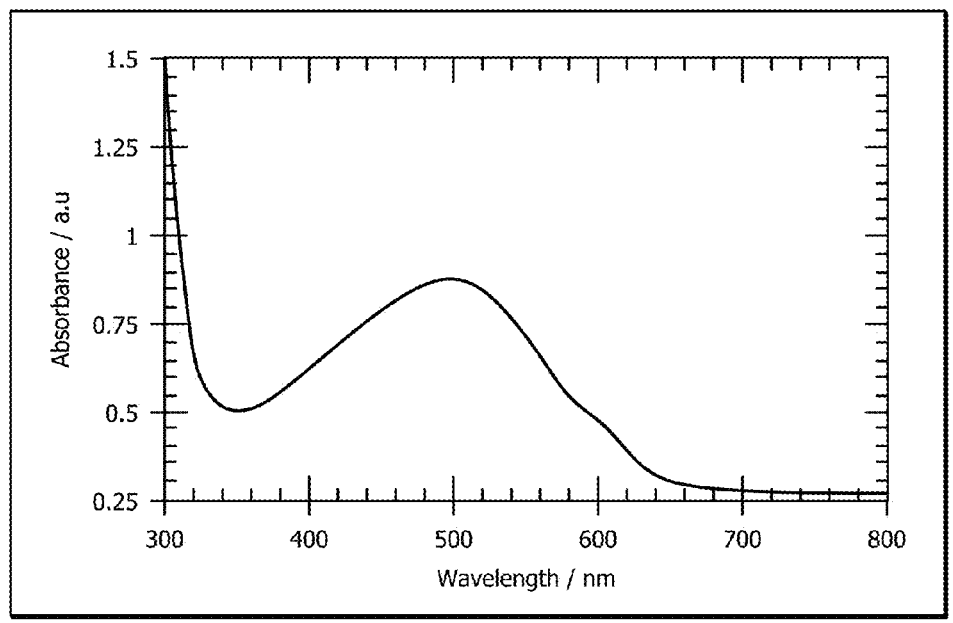
FIG. 14 is a depiction of UV-spectroscopy of an ND-P3OT blend.

FIG. 14 shows the nano-hybrid with P3OT with nanodiamond. It shows the characteristics bands of P3OT. The addition of nanodiamond simply increases the absorption magnitude by no change of P3OT parent polymer.

The structures of blended with nanodiamond of P3OT is shown in FIGS. 15(a)-(c) (SEM pictures) and FIGS. 16(a)-(b) (TEM pictures). Processing methods and the type of solvent play a critical role on the degree of organization of the conjugated polymer with nanodiamond. FIGS. 16(a)-(b) shows the TEM images of the simple aggregation and crystallization of the P3OT conducting polymer after evaporation of the solvent.

Figures 17A, 17B:
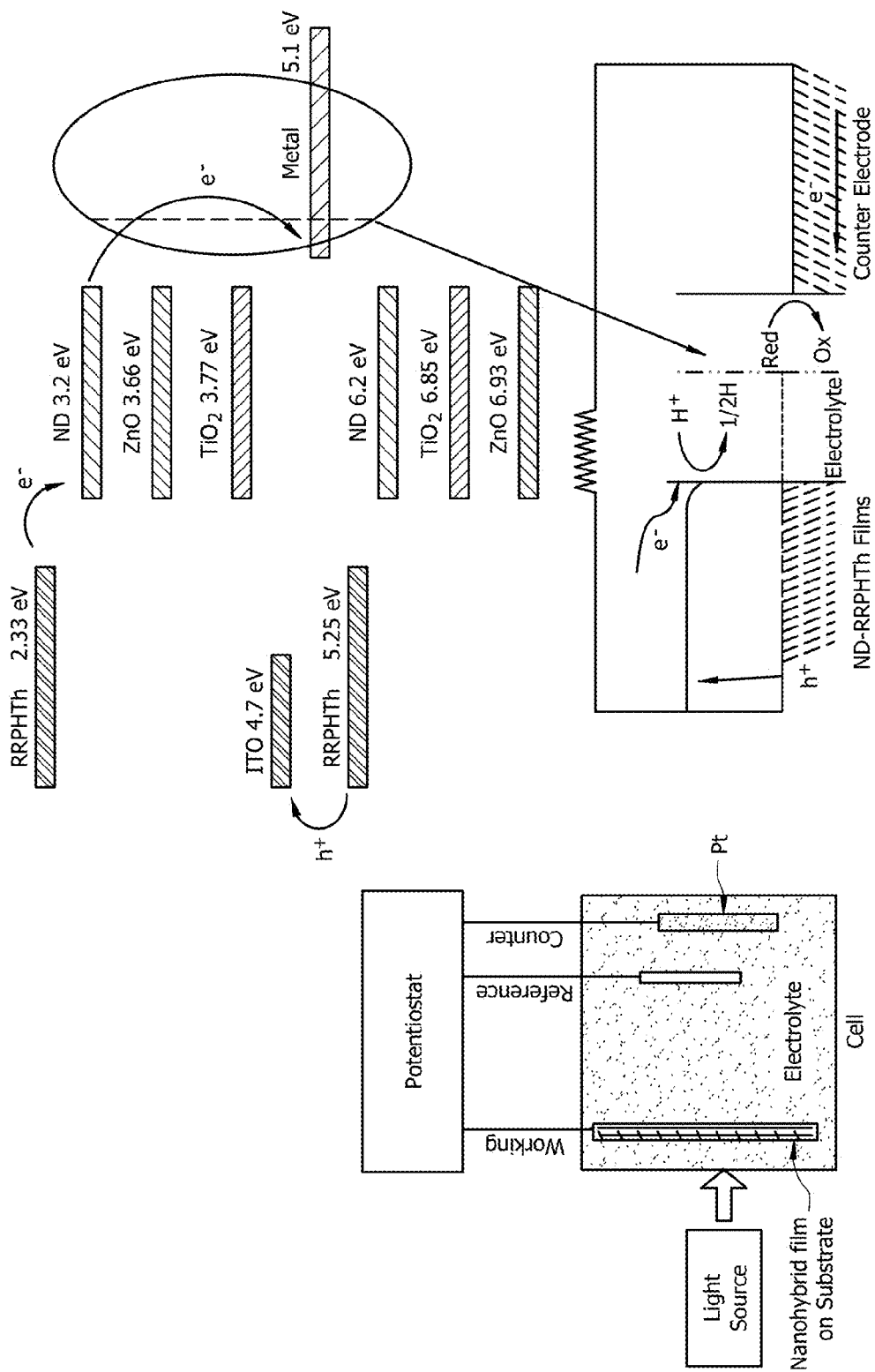
FIG. 17(a) is a schematic of the photoelectrochemical cell with ND-RRPHTh.
FIG. 17(b) is a depiction of an energy band diagram, including the possible redox process of ND-RRPHTh. The energy band diagrams of TiO$_2$ and ZnO are also included as references with respect to ND, RRPHTh, and ITO in the generation of photocurrent.

The schematic of the photoelectrochemical cell and the energy band diagram, including the possible redox process in the photoelectrochemical cell of ND-RRPHTh, are shown in FIG. 17 including the schematic of the photoelectrochemical set up and the excitation of light with generation of photocurrent. In addition, FIG. 17 shows the energy band diagram of $TiO_2$ and ZnO each with RRPHTh-ITO in the generation of photocurrent with respect to ND (Qiao, Q.; Lianyoung, S.; Beck, J.; McLeskey, J. T. *J. Appl. Phys*. 2005, 98, 094906; Lyon, J. E.; Cascio, A. J.; Beerbom, M. M.; Schlaf, R.; Zhu, Z.; Jenekhe, S. A. *Appl. Phys. Lett*. 2006, 88, 222109; Huang, Z.; Zhang, J.; Yang, X.; Cao, W. *J Inorg Organomet Polym*. 2010, 20, 161-167; Huang, Z.; Zhang, J.; Yang, X.; Cao, W. *J Mater Sci: Mater Electron*. 2010, 21, 1137-1143).

To understand that the electrochemical properties are diffusion controlled systems, the CVs of RRPHTh, ND-RRPHTh, ZnO-RRPHTh and $TiO_2$-RRPHTh at different scan rate (5, 10, 20, 50, 100 mV/sec) in tetra-butyl-ammonium-tetrafluoroborate (TBATFB) electrolyte are shown in FIGS. 8(a)-(d), respectively. The CV is reversible regardless of the presence of different types of nanoparticles blended with the RRPHTh.

Figure 18:
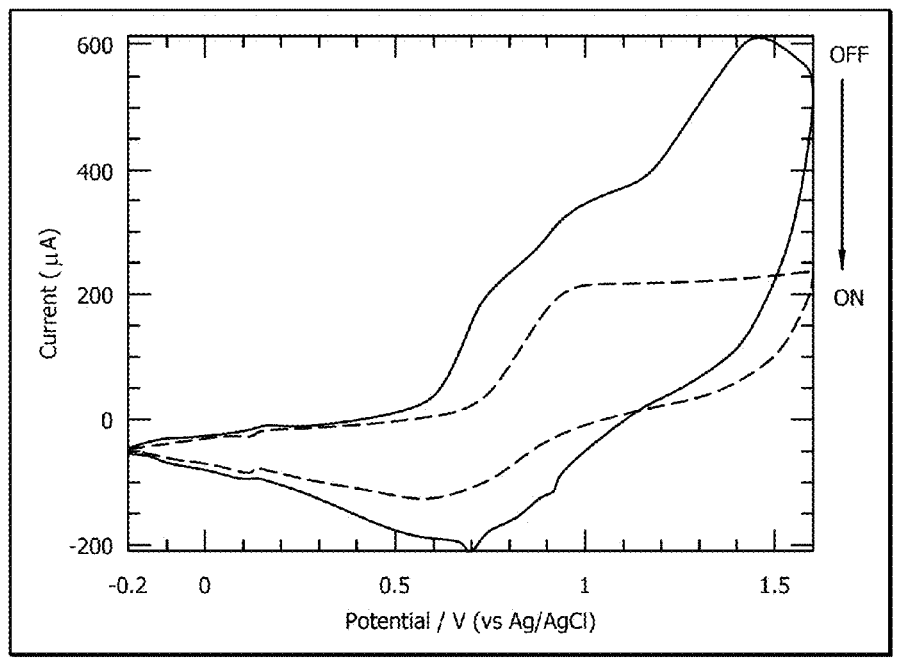
FIG. 18 is a depiction of CV in 0.2 M LiClO4 electrolyte with light and without light.

FIG. 18 shows the cyclic voltammogram of ND-P3OT nano-hybrid in 0.2 M $LiClO_4$. The unexpected effect, the on/off light switch, and the electrochemical photo-response can be seen for all the applied potential range from −0.2 to 1.5 V.

FIG. 11 shows the photo electrochemical current obtained from the ND-RRPHTh nano-hybrid film deposited on ITO coated glass plate at no applied potential. The 60 Watt light source was switched on/off on the films at different electrolytes: (a) CSA, (b) TBATFB (c) $LiClO_4$ and (d) HCl. Unexpectedly, the TBATFB containing electrolyte shows the highest current for ND-RRPHTh film. The reversible electrochemistry in the film has been seen.

Figure 19A:
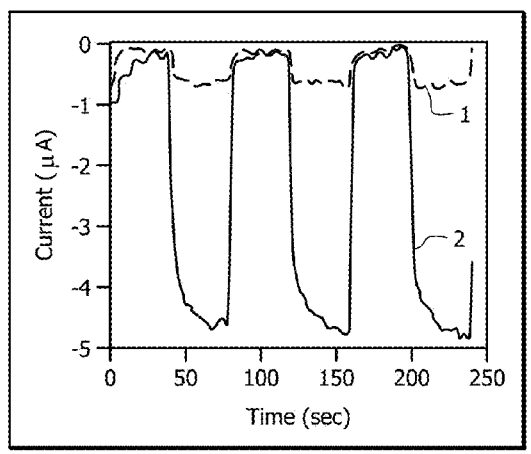
FIG. 19(a) is a graphical illustration when no potential is applied, curve 1 being a P3OT polymer and curve 2 being an ND-P3OT blend.
Figure 19B:
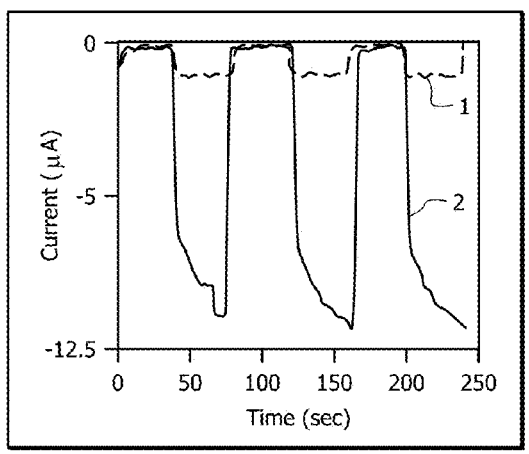
FIG. 19(b) is a graphical illustration at potential of 200 mV apply, curve 1 being a P3OT polymer and curve 2 being an ND-P3OT blend in 0.2M LiClO$_4$ electrolyte.

FIG. 19(a) shows the no-potential application where curve 1 is for P3OT and curve 2 is for ND-P3OT nano-hybrid structure. FIG. 19(b) shows the potential application of 200 mV where curve 1 is P3OT polymer and curve 2 is for ND-P3OT blend in 0.2M LiClO4 electrolyte. The presence of nanodiamond increases the photocurrent nearly five times more than the parent polymer similar to RRPHTh. The small potential application shows the enhancement of around 10 to 11 times greater than the parent polymer similar to RRPHTh.

FIG. 12 reveals the photoelectrochemical time response of ND-RRPHTh in different electrolytes CSA, $LiClO_4$ and TBATFB as a function of the applied potential. The different potential was applied and the photocurrent of ND-RRPHTh was measured, showing that TBATFB containing electrolyte has larger current than CSA and $LiClO_4$ containing electrolytes.

In conclusion, nano-hybrid films of ND-RRPHTh, ZnO-RRPHTh, $TiO_2$-RRPHTh and ND-P3OT on indium tin oxide (ITO) coated glass plate, n-type Si and gold coated glass surface were fabricated and characterized using a combination of physical and electrochemical techniques. It has been demonstrated that the incorporation of small quantities of nanodiamond synergistically enhances photoconductivity in polythiophene polymers. The photo electrochemical properties of ND-RRPHTh and ND-P3OT are higher than parent polymer, ZnO-RRPHTh, and $TiO_2$-RRPHTh nano-hybrid films. Substituted composite polythiophenes can be fabricated and blended with ND for photoelectrochemical applications.

All referenced publications are incorporated herein by reference in their entireties to the same extent as if they were individually incorporated by reference. Furthermore, where a definition or use of a term in a reference, which is incorporated by reference herein is inconsistent or contrary to the definition of that term provided herein, the definition of that term provided herein applies and the definition of that term in the reference does not apply.

It will be seen that the advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. An electrolytic cell system used in photoelectrochemical applications, comprising:
   a nano-hybrid film formed of a conducting regioregular polythiophene substantially uniformly blended with nanoparticles including nanodiamonds on a working electrode, a counter electrode and a reference electrode arranged in at least one electrolyte in order to form a blend formation of said nanodiamonds with said regioregular polythiophene, wherein said blend formation shows crystallinity due to diffusion of said nanoparticles to nucleation sites to form a hexagonal arrangement of said regioregular polythiophene with said nanodiamonds,
   wherein said nanodiamonds synergistically enhance photoconductivity of said nano-hybrid film,
   wherein said regioregular polythiophene is an electron donor and said nanodiamonds are an electron acceptor, such that electrons undergo a photoinduced transfer from said regioregular polythiophene to said nanodiamonds, wherein said nano-hybrid film accepts said electrons from electron hole pairs.

2. The electrolytic cell system of claim 1, further comprising:
said regioregular polythiophene being a regioregular polyhexylthiophene.

3. The electrolytic cell system of claim 1, further comprising:
said nanoparticles further including zinc oxide.

4. The electrolytic cell system of claim 1, further comprising:
said nanoparticles further including titanium oxide.

5. The electrolytic cell system of claim 1, further comprising:
said working electrode being an indium tin oxide coated glass plate.

6. The electrolytic cell system of claim 5, further comprising:
said counter electrode being an n-type silicon coated glass surface.

7. The electrolytic cell system of claim 6, further comprising:
said reference electrode being a gold coated glass surface.

8. The electrolytic cell system of claim 1, further comprising:
said at least one electrolyte being tetrabutylammonium tetrafluoroborate.

9. The electrolytic cell system of claim 1, further comprising:
said nano-hybrid film arranged in a photoelectrochemical cell.

10. The electrolytic cell system of claim 1, further comprising:
the nano-hybrid film having a thickness of about 500 nm to about 1 µm.

11. The electrolytic cell system of claim 1, further comprising:
said polythiophene blended with said nanoparticles has a particle diameter of about 20 nm to about 100 nm, whereby said nanodiamonds aggregated into a larger size prior to blending with said polythiophene.

12. The electrolytic cell system of claim 1, further comprising:
said regioregular polythiophene including a poly(3-octylthiophene-2,5-diyl).

13. An electrolytic cell system used in photoelectrochemical applications, comprising:
a nano-hybrid film formed of a conducting regioregular polythiophene, including a regioregular polyhexylthiophene and a poly(3-octylthiophene-2,5-diyl) polymer, substantially uniformly blended with nanoparticles including nanodiamonds, zinc oxide, and titanium oxide on an indium tin oxide coated glass plate acting as a working electrode, an n-type silicon coated glass surface acting as a counter electrode, and a gold coated glass surface acting as a reference electrode arranged in at least one electrolyte in order to form a blend formation of said nanodiamonds with said regioregular polythiophene, wherein said blend formation shows crystallinity due to diffusion of said nanoparticles to nucleation sites to form a hexagonal arrangement of said regioregular polythiophene with said nanodiamonds, said at least one electrolyte including tetrabutylammonium tetrafluoroborate, said nanodiamonds synergistically enhancing the photoconductivity of said nano-hybrid film, wherein said regioregular polythiophene is an electron donor and said nanodiamonds are an electron acceptor, such that electrons undergo a photoinduced transfer from said regioregular polythiophene to said nanodiamonds;

said film arranged in a photoelectrochemical cell;

said nano-hybrid film having a thickness of about 500 nm to about 1 µm; and said polyhexylthiophene blended with said nanoparticles has a particle size of about 20 nm to about 100 nm, whereby said nanodiamonds aggregated into a larger size prior to blending with said polythiophene, wherein said nano-hybrid film accepts said electrons from electron hole pairs.

14. A method of fabricating a photoelectrochemical cell with enhanced photoconductivity, said method comprising the steps of:

providing a conducting regioregular polyhexylthiophene polymer;

blending nanoparticles into said polyhexylthiophene polymer, said nanoparticles including nanodiamonds in order to form a blend formation of said nanodiamonds with said regioregular polythiophene, wherein said blend formation shows crystallinity due to diffusion of said nanoparticles to nucleation sites to form a hexagonal arrangement of said regioregular polythiophene with said nanodiamonds, wherein said regioregular polythiophene is an electron donor and said nanodiamonds are an electron acceptor, such that electrons undergo a photoinduced transfer from said regioregular polythiophene to said nanodiamonds, wherein said nanodiamonds synergistically enhance photoconductivity of said nano-hybrid film;

disposing a mixture of said polyhexylthiophene polymer and said nanoparticles onto a substrate containing a working electrode, a counter electrode, and a reference electrode arranged within at least one electrolyte, wherein said nano-hybrid film accepts said electrons from electron hole pairs.

15. The method of claim 14, further comprising the step of:
blending zinc oxide into said mixture of said polyhexylthiophene polymer and said nanoparticles.

16. The method of claim 14, further comprising the step of:
blending titanium oxide into said mixture of said polyhexylthiophene polymer and said nanoparticles.

17. The method of claim 14, further comprising:
said working electrode being an indium tin oxide coated glass plate;
said counter electrode being an n-type silicon coated glass surface; and
said reference electrode being a gold coated glass surface.

18. The method of claim 14, further comprising:
said at least one electrolyte being tetrabutylammonium tetrafluoroborate.

19. The method of claim 14, further comprising the step of:
blending a poly(3-octylthiophene-2,5-diyl) polymer into said mixture of said polyhexylthiophene polymer and said nanoparticles.

\* \* \* \* \*